United States Patent
Tanaka

(10) Patent No.: US 6,224,217 B1
(45) Date of Patent: *May 1, 2001

(54) OPTICAL ILLUMINATION APPARATUS AND IMAGE PROJECTION APPARATUS

(75) Inventor: Takaaki Tanaka, Hirakata (JP)

(73) Assignee: Matsushita Electric Industrial Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/404,147

(22) Filed: Sep. 27, 1999

(30) Foreign Application Priority Data

Sep. 28, 1998 (JP) .................................. 10-273404
Sep. 24, 1999 (JP) .................................. 11-269870

(51) Int. Cl.$^7$ .................................. G03B 21/14
(52) U.S. Cl. .................................. 353/94; 353/38; 353/31
(58) Field of Search .................................. 353/38, 94, 31, 353/33, 34, 37, 30; 349/5, 8, 9; 362/309, 336

(56) References Cited

U.S. PATENT DOCUMENTS

| 5,098,184 | 3/1992 | van den Brandt et al. . | |
| 5,300,966 | * 4/1994 | Uehira et al. | 353/94 |
| 5,504,544 | 4/1996 | Dreyer et al. . | |
| 5,649,753 | * 7/1997 | Masumoto | 353/38 |
| 5,669,686 | * 9/1997 | Moon | 353/94 |
| 5,743,612 | * 4/1998 | Matsuda et al. | 353/31 |
| 5,765,934 | * 6/1998 | Okamori et al. | 353/94 |
| 6,042,753 | * 3/2000 | Itoh | 353/20 |

FOREIGN PATENT DOCUMENTS

| 6-242397 | 9/1994 | (JP) . |
| 6-265887 | 9/1994 | (JP) . |

* cited by examiner

Primary Examiner—William Dowling
(74) Attorney, Agent, or Firm—Smith, Gambrell & Russell, LLP

(57) ABSTRACT

An optical illumination apparatus including a plurality of light sources, elliptical mirrors, a reflecting apparatus for reflecting light in a predetermined direction, a converging apparatus for accepting the light from the reflecting apparatus and sending out substantially parallel light, and two lens array plates, and an image projection apparatus using the optical illumination apparatus. It is possible to highly efficiently and uniformly illuminate an image forming apparatus with light from the plurality of light sources by regulating within constant values an eccentricity of each optical axis of the light coming from the plurality of light sources against an optical axis of the optical illumination apparatus.

30 Claims, 14 Drawing Sheets

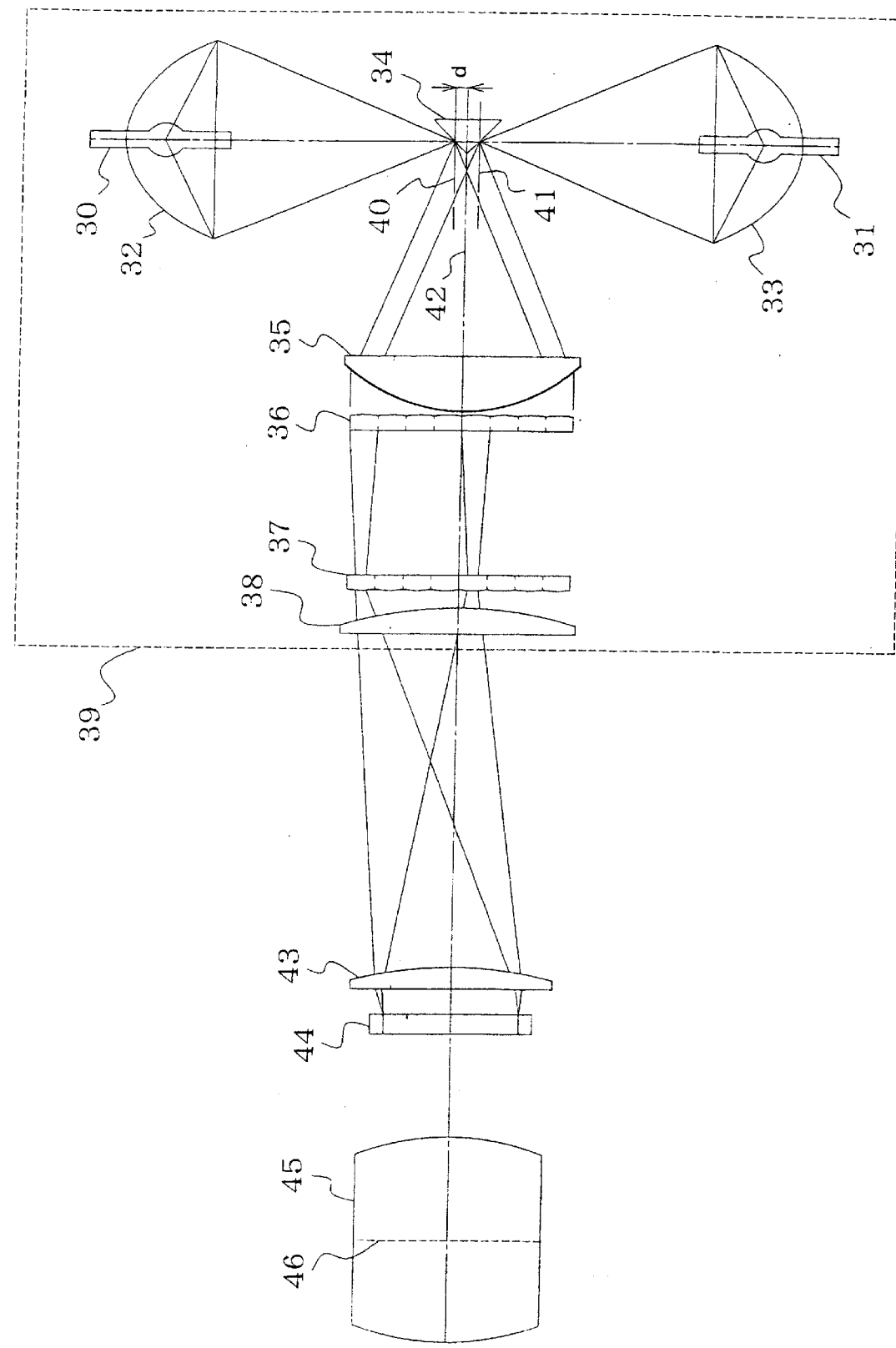

OPTICAL ILLUMINATION APPARATUS AND IMAGE PROJECTION APPARATUS

BACKGROUND OF THE INVENTION

1. Field of the Invention

The present invention relates to an optical illumination apparatus illuminating image forming means with light from a light source, and an image projection apparatus illuminating an image, which is formed in the image forming means, with illumination light, and projecting the image on a screen with enlarging the image with a projection lens.

2. Description of the Related Art

In order to obtain an image on a large screen, an image projection apparatus is used, the image projection apparatus which illuminates small image forming means, forming an optical image according to a picture signal with light from light source, and projects the optical image on a screen with enlarging the optical image with a projection lens. As the image forming means, transmissive liquid crystal panels are widely used in practical use, the transmissive liquid crystal panels each of which is in an active matrix method, has such configuration that polarizing plates are arranged in crossed Nicols in both sides of each twisted nematic liquid crystal cell, and modulates light with using polarization. Two lens array plates configured by a plurality of lenses are used in an optical illumination apparatus illuminating a liquid crystal panel with light from light source (for example, U.S. Pat. No. 5,098,184). The two lens array plates efficiently and uniformly illuminates the liquid crystal panel by dividing a light beam incident on one of the lens array plates, which is located in a light source side, into multiple light beams, and superimposing each light beam on the liquid crystal panel.

In addition, as an optical illumination apparatus for an image projection apparatus using an liquid crystal panel using polarization, an optical illumination apparatus is disclosed, the optical illumination apparatus which constructs a polarization transforming optical member transforming natural light into light in one polarization direction with using a polarization separating prism which is polarization separating means and a half-wave plate which is polarization rotating means, increases an efficiency of light utilization in the image projection apparatus, and makes the image projection apparatus brighter (for example, U.S. Pat. No. 5,098,184). Furthermore, so as to make an image projection apparatus brighter, an optical illumination apparatus using a plurality of light sources is disclosed (for example, Japanese Patent Laid-Open Nos. 6-265887 and 6242397).

FIG. 14(a) shows an image projection apparatus introducing a conventional optical illumination apparatus using a plurality of light sources. Light emitted from two discharge lamps 1 and 2, which are light sources, is converted into nearly parallel light beams by being converged by respective concave mirrors 3 and 4. Respective parallel light beams enter into a first lens array plate corresponding to them. The first lens array plate 5 is configured by a plurality of rectangular lenses, divides the incident light beams into multiple light beams with respective rectangular lenses, and converges the multiple light beams on a plurality of respective lenses in the second lens array plate 6. Multiple minute light source images are formed on the respective lenses in the second lens array plate 6. The second lens array plate 6 focuses and superimposes images of the respective lenses of the first lens array plate 5 on liquid crystal panels 16 to 18.

The light outgoing from an optical illumination apparatus 7 illuminates liquid crystal panels 16 to 18 corresponding to respective rays of colored light after being divided with dichroic mirrors 8 and 9 into three primary colors: green; red; and blue. In this manner, the optical illumination apparatus 7 performs uniform illumination by superimposing multiple light beams, which are divided, on the liquid crystal panels. Relay lenses 11 and 12 correct the difference between intensities of respective illumination light to the liquid crystal panels that are caused by different optical paths of the illumination light that are distances from the second lens array plate and liquid crystal panels. Field lenses 13 to 15 converge the illumination light to the liquid crystal panels 16 to 18 on a pupil surface 21 of a projection lens 20. After the three primary colors, which are blue, green, and red, outgoing from the liquid crystal panels 16 to 18, are synthesized with a dichroic prism 19, the three primary colors synthesized enter into the projection lens 20. The projection lens 20 enlarges and projects images of liquid crystal panels 16 to 18 on a screen (not shown). Since the plurality of light sources are used, it is possible to configure a bright image projection apparatus.

FIG. 14(b) shows a mode of light source images formed on the pupil surface 21 of the projection lens 20. The two light sources 1 and 2 are made to be minute light source images 24 with the lens array plate, and light source image groups 22 and 23 are formed.

Generally speaking, so as to increase the brightness of an image projection apparatus, it is sufficient to increase the power consumption of a discharge lamp. Nevertheless, there is such a task that, if the power consumption is increased with keeping the life of the discharge lamp, a light emitting portion becomes large and hence an efficiency of light utilization decreases. For this reason, it is possible to more efficiently increase the brightness of the image projection apparatus by using a plurality of light sources whose power consumption is relatively small. In the configuration of a conventional optical illumination apparatus using a plurality of light sources like the apparatus shown in FIG. 14(a), two light sources are symmetrically located with sandwiching an optical axis of a projection lens. In such a case, images of light sources formed on the pupil surface of the projection lens are formed as the images from two light sources with sandwiching the optical axis as shown by the pupil surface of the projection lens in FIG. 14(b). Since there is a vignetting in a projection lens, peripheral illumination is lower than central illumination on a screen. This is because an eclipse arises in the light source images on the pupil surface of the projection lens due to the vignetting. Therefore, if luminescence properties of the two light sources located with sandwiching the optical axis are different from each other, light source images contributing to the brightness in the peripheral part of the screen are different from each other. Hence, irregular color in a projected image arises on the screen. In addition, there arises such a task that, if one of two light sources is burnt out, a luminance distribution on the screen becomes uneven.

Furthermore, if such an optical illumination apparatus is introduced in such an image projection apparatus that is shown in FIG. 14(a), in regard to red light among the three primary color light, light source images formed on the pupil surface of the projection lens are inverted against the optical axis. Therefore, as for respective light source images on a pupil surface of a projection lens, green and blue images of the light source 1 are formed in an area 22, and red images of the light source 1 are formed in an area 23. Moreover, green and blue images of the light source 2 are formed in an area 23, and red images of the light source 2 are formed in an area 22. For this reason, even if luminescence properties of the two light sources are slightly different from each other, a mode of eclipses in the light source images changes due to vignetting in the projection lens. In consequence, there arises such a task that large-scale irregular color on the screen arises.

Therefore, in case an optical illumination apparatus and an image projection apparatus are configured by a plurality of light sources being used, it is necessary to configure the optical illumination apparatus wherein light source images on a pupil surface of a projection lens that are formed by respective light sources are as symmetrical as possible against an optical axis, and wherein the optical illumination apparatus is highly efficient.

Furthermore, in the configuration shown in FIG. 14(a), a small F-number of the projection lens is required so as to efficiently introduce light from the optical illumination apparatus. Nevertheless, there is such a task that the decrease of the F-number of the projection lens leads to the increase of size and cost of the projection lens.

In addition, there is also such a task that first and second lens array plates are required in connection with two concave mirrors and hence manufacturing cost increases.

SUMMARY OF THE INVENTION

An object of the present invention is to provide an optical illumination apparatus, which can uniformly and efficiently illuminate an image forming means with light from light sources even if a plurality of light sources are used in the optical illumination apparatus used in an image projection apparatus, and the bright image projection apparatus.

The first invention of the present invention is an optical illumination apparatus for converging light from light sources and illuminating image forming means for forming an image, comprising:

a plurality of light sources;

elliptical mirrors for converging light, emitted from the plurality of light sources, respectively;

reflecting means, each of which is located near a focal point of each of the ellipsoidal mirrors, for accepting light from the ellipsoidal mirrors and reflecting the light in a predetermined direction;

converging means for accepting the light reflected by the reflecting means and sending out substantially parallel light;

a first lens array plate, which is configured by a plurality of lenses, for dividing the light coming from the converging means into multiple light beams; and a second lens array plate, which is configured by a plurality of lenses, for accepting the light from the first lens array plate, wherein optical axes of respective rays of light coming from the plurality of light sources are decentered against an optical axis of the optical illumination apparatus; and wherein an eccentricity d meets the following in equal equation:

$$0.19\ m \leq d \leq 0.55\ m$$

where m is a paraxial magnification of each ellipsoidal mirror that is a ratio between a distance from an apex of the ellipsoidal mirror to a second focal point of the ellipsoidal mirror and a distance from the apex to a first focal point of the ellipsoidal mirror.

The second invention of the present invention is an optical illumination apparatus for converging light from light sources and illuminating image forming means for forming an image, comprising:

a plurality of light sources;

elliptical mirrors for converging light, emitted from the plurality of light sources, respectively;

reflecting means, each of which is located near a focal point of each of the ellipsoidal mirrors, for accepting light from the ellipsoidal mirrors and reflecting the light in a predetermined direction;

converging means for accepting the light reflected by the reflecting means and sending out substantially parallel light;

a first lens array plate, which is configured by a plurality of lens elements, for dividing the light coming from the converging means into multiple light beams; and a second lens array plate, which is configured by a plurality of lens elements, for accepting the light from the first lens array plate, wherein optical axes of respective rays of light coming from the plurality of light sources are decentered against an optical axis of the optical illumination apparatus; and wherein the following in equal equation is established:

$$0.33 \leq d/p \leq 0.52$$

where d is an eccentricity and p is a pitch of lens elements of the first lens array plate.

The third invention of the present invention is the optical illumination apparatus according to any one of said first and second inventions, comprising:

polarization separating means for separating natural light, which outgoes from the second lens array plate, into two rays of polarized light whose polarized directions are orthogonal to each other; and polarization rotating means for rotating a direction of one ray of polarized light included in the two rays of polarized light that outgo from the polarization separating means.

The fourth invention of the present invention is the optical illumination apparatus according to any one of said first to third inventions, wherein the reflecting means is a reflecting prism comprising a plurality of reflecting surfaces.

The fifth invention of the present invention is the optical illumination apparatus according to any one of said first to third inventions, wherein an aluminum film or a dielectric film is provided in each reflecting surface of the reflecting means.

The sixth invention of the present invention is the optical illumination apparatus according to any one of said first to third inventions, wherein the converging means comprises an a spherical lens that decreases a spherical aberration.

The seventh invention of the present invention is the optical illumination apparatus according to said sixth invention, wherein the a spherical lens is produced by molding.

The eighth invention of the present invention is the optical illumination apparatus according to said sixth invention, wherein the a spherical lens is made of a resin.

The ninth invention of the present invention is the optical illumination apparatus according to said third invention, wherein the polarization separating means is a polarization separating prism array where a plurality of polarization separating prisms, each of which comprises a polarization separating film and a reflective film, are arrayed at a constant pitch in the direction perpendicular to a plane including optical axes of respective rays of light coming from the plurality of light sources.

The tenth invention of the present invention is the optical illumination apparatus according to said third invention, wherein the polarization rotating means is a half-wave plate made of a drawn resin film.

The eleventh invention of the present invention is an image projection apparatus comprising:

an optical illumination apparatus according to any one of said first to third inventions;

image forming means for accepting light from the optical illumination apparatus and forming an optical image according to a picture signal; and a projection lens for projecting the optical image, formed on the image forming means, on a screen.

The twelfth invention of the present invention is an image projection apparatus comprising:

an optical illumination apparatus according to any one of said first to third inventions;

color separating optical means for separating white light from the light sources into blue, green, and red colored light;

three sets of image forming means for accepting respective rays of colored light coming from the color separating optical means and forming each optical image according to a picture signal;

color synthesizing optical means for accepting the blue, green, and red colored light outgoing from the image forming means and synthesizing the blue, green, and red colored light; and a projection lens for projecting the optical image, formed on the image forming means, on a screen.

The thirteenth invention of the present invention is an image projection apparatus comprising:

an optical illumination apparatus according to any one of said first to third inventions;

color separating optical means for separating white light from the light sources into blue, green, and red colored light;

polarization separating prisms for accepting respective rays of colored light from the color separating optical means and separating each of the incident light into two beams of light having two polarized directions that are orthogonal to each other;

three sets of image forming means for accepting respective rays of light coming from the polarization separating prisms and forming respective optical images according to a picture signal;

color synthesizing optical means for synthesizing the blue, green, and red colored light entering after passing through the polarization separating prisms and outgoing from the image forming means; and a projection lens for projecting the optical images, formed on the image forming means, on a screen.

The fourteenth invention of the present invention is the image projection apparatus according to any one of said eleventh and twelfth inventions, wherein the image forming means are transmissive liquid crystal panels.

The fifteenth invention of the present invention is the image projection apparatus according to said thirteenth invention, wherein the image forming means are reflective liquid crystal panels.

In the case when light from the plurality of light sources is converged and synthesized near an optical axis of the optical illumination apparatus as the configuration described above, it is possible to realize the optical illumination apparatus, which efficiently and uniformly illuminates the image forming means with light from the plurality of light sources by regulating within certain relational values an eccentricity d of each optical axis of the light from the plurality of light sources against the optical axis of the optical illumination apparatus, a paraxial magnification m of each ellipsoidal mirror, and a lens element pitch p of a first lens array plate.

In addition, even if a plurality of light sources are used, it is possible to form multiple minute light source images, which are formed on a pupil surface of the projection lens, symmetrically about the optical axis. Hence, it is possible to obtain the good uniformity of luminance and color on a screen.

Therefore, it is possible to configure the optical illumination apparatus wherein the efficiency of light utilization is high and the uniformity is good.

In addition, by using the optical illumination apparatus described above, it is possible to synthesize a plurality of light sources without decreasing an F-number of the projection lens. Hence, it is possible to configure the image projection apparatus that is small, low-cost, and highly efficient.

BRIEF DESCRIPTION OF THE DRAWINGS

FIG. 1 is a structural drawing of an optical illumination apparatus according to a first embodiment of the present invention;

Figure 2B:
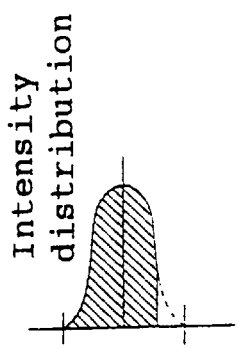
FIGS. 2(a) to 2(c) are explanatory diagrams of the operation of the optical illumination apparatus synthesizing light from a plurality of light sources.

DESCRIPTION OF SYMBOLS 30, 31, 60, 61, 90, 91, 130, and 131 Lamps
32, 33, 62, 63, 92, 93, 132, and 133 Ellipsoidal mirrors
34, 64, 94, and 134 Reflecting prisms
35, 65, 95, and 135 Condenser lenses
36, 66, 96, and 136 First lens array plates
37, 67, 97, and 137 Second lens array plates
38, 68, 99, and 138 Illumination lenses
39, 69, 100, and 139 Optical illumination apparatuses
40, 41, 70, 71, 101, 102, 140, and 141 Optical axes of light from light sources
42, 72, 103, and 142 Optical axes of optical illumination apparatuses
43, 73, 105, 143, 168, 169, and 170 Field lenses
44, 74, 106, 144, 171, 172, and 173 Liquid crystal panels
45, 75, 107, 145, 177, and 195 Projection lenses
46, 76, 108, and 146 Pupil surfaces of projection lenses
47, 48, 81, 82, 83, and 84 Minute light source images
77 and 78 Illuminating light beam diameters
79 and 80 Lens elements in the column wise direction near the first lens array plate
98 Polarization transforming optical member
110 Polarization separating film
111 Reflective film
112 Polarization separating prism array
113 190, and 191 Half-wave plates
147 Screen
160 Blue-reflective dichroic mirror
161 and 181 Green-reflective dichroic mirrors
161 and 182 Color separating means
163 164, 165, and 183 Mirrors
166 and 167 Relay lenses
174 and 193 Blue-reflective dichroic mirrors
175 and 192 Red-reflective dichroic mirrors
176 and 194 Dichroic prisms
180 Red-pass dichroic mirror
184, 185, and 186 Polarization separating prisms
187, 188, and 189 Reflective liquid crystal panels

DESCRIPTION OF THE PREFERRED EMBODIMENTS

Hereinafter, optical illumination apparatuses and image projection apparatuses according to embodiments of the present invention will be described with reference to drawings.

(Embodiment 1)

FIG. 1 is a structural drawing of a first optical illumination apparatus of the present invention. Here, a liquid crystal panel that modulates light with using polarization and scattering is used as an image forming means.

In FIG. 1, reference numbers 30 and 31 denote lamps that are light sources, and reference numbers 32 and 33 denote ellipsoidal mirrors. Reference number 34 denotes a reflecting prism that is reflecting means, and 35 denotes a condenser lens that is converging means. Reference number 36 denotes a first lens array plate, and 37 denotes a second lens array plate. Reference number 38 denotes an illumination lens, and 39 denotes a first optical illumination apparatus of the present invention. Reference numbers 40 and 41 denote optical axes of light from the plurality of light sources 30 and 31 respectively, and 42 denotes an optical axis of the optical illumination apparatus 39. Reference symbol denotes an eccentricity of the optical axis 40 of light from the light source 30 against the optical axis 42. An eccentricity of the optical axis 41 also is d. Reference number 43 denotes a field lens, 44 denotes an liquid crystal panel, 45 denotes a projection lens, and 46 denotes a pupil surface of the projection lens 45. In addition, an angle between a normal line to a reflecting surface of the reflecting prism 34 and the optical axis of each light source is made to be within the range of 45°±1°. Owing to this, the optical axes 40 and 41 of the light after reflection of the light, outgoing from the light sources 30 and 31, on the reflecting surfaces of the reflecting prism 34 substantially become parallel to the optical axis 42 respectively.

In the above configuration, light emitted from the lamps 30 and 31 configured by metal halide lamps, ultra-high, or xenon lamps is converged by the ellipsoidal mirrors 32 and 33 corresponding to light from respective lamps. Furthermore, the light forms focused spots near second focuses of the ellipsoidal mirrors 32 and 33 respectively. This optical illumination apparatus 39 of this embodiment is configured so that the respective focused spots of the ellipsoidal mirrors 32 and 33 may be formed near the optical axis 42 of this optical illumination apparatus 39.

The reflecting prism 34 having reflecting surfaces corresponding to the number of light sources is located near the focused spots, and the reflecting prism 34 changes the optical axes 40 and 41 in the predetermined direction. An area of a reflecting surface of the reflecting prism 34 is nearly equal to the size of one of the focused spots. The optical axes 40 and 41 are decentered by the eccentricity d respectively against the optical axis 42 of the optical illumination apparatus 39.

In this manner, the light from the light sources 30 and 31 is converged near the optical axis 42 of the optical illumination apparatus 39, and is synthesized. The two focused spots are formed with sandwiching the optical axis 42 and near optical axis 42.

Here, a prism is used as a member configuring reflecting surfaces. Reasons why the prism is used are to secure effective areas of reflecting surfaces near the optical axis 42 and to secure profile irregularity.

In addition, reflecting surfaces are configured by using aluminum films or dielectric multilayers reflecting visible light. The light from the reflecting prism 34 is converted into nearly parallel light by the condenser lens 35.

The condenser lens 35 is an aspherical lens eliminating spherical aberration. The aspherical condenser lens 35 can be produced in low cost by being produced by molding. In addition, by producing the condenser lens 35 with a resin, it becomes possible to produce the condenser lens 35 in lower cost and to save weight of the optical illumination apparatus.

The nearly parallel light from the condenser lens 35 enters into the first lens array plate 36 configured by a plurality of lenses. The light beams entering into the first lens array plate 36 are divided into multiple light beams. The multiple light beams divided are converged on the second lens array plate 37 configured by a plurality of lenses. Multiple minute light source images of the plurality of light sources 30 and 31 are formed on the second lens array plate 37.

Each focal length of lens elements of the first lens array plate 36 is made to be equal to the gap between the first lens array plate 36 and second lens array plate 37. Each lens element of the first lens array plate 36 has an aperture shape similar to that of the liquid crystal panel. Each focal length of lens elements of the second lens array plate 37 is determined so that a surface of the first lens array plate 36 may become nearly conjugate with a surface of the liquid crystal panel 44.

The illumination lens 38 is a lens for illuminating the liquid crystal panel 44 with the light outgoing from respective lens elements of the second lens array plate 37 with superimposing the light on the liquid crystal panel 44. Furthermore, its focal length is made to be the distance between a surface of the illumination lens 38 and a surface of the liquid crystal panel 44.

In addition, each lens element of the first and second lens array plates 36 and 37 is adequately decentered so as to efficiently illuminate the liquid crystal panel 44. Multiple light beams outgoing from the second lens array plate 37 are superimposed on the liquid crystal panel 44, and highly efficiently and uniformly illuminates the liquid crystal panel 44.

The field lens 43 is a lens for converging the light, with which the liquid crystal panel 44 is illuminated, on the pupil surface 46 of the projection lens 45. The pupil surface 46 of the projection lens 45 is nearly conjugate with a surface of the second lens array plate 37. The projection lens 45 projects an optical image, which is formed in the liquid crystal panel 44, on a screen (not shown).

Figure 2C:
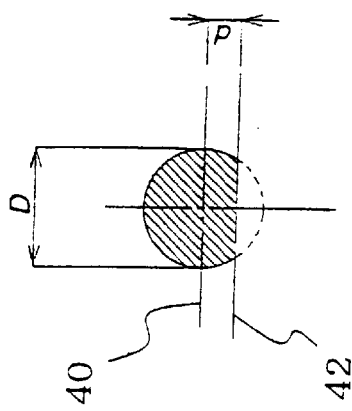
Figure 2A:
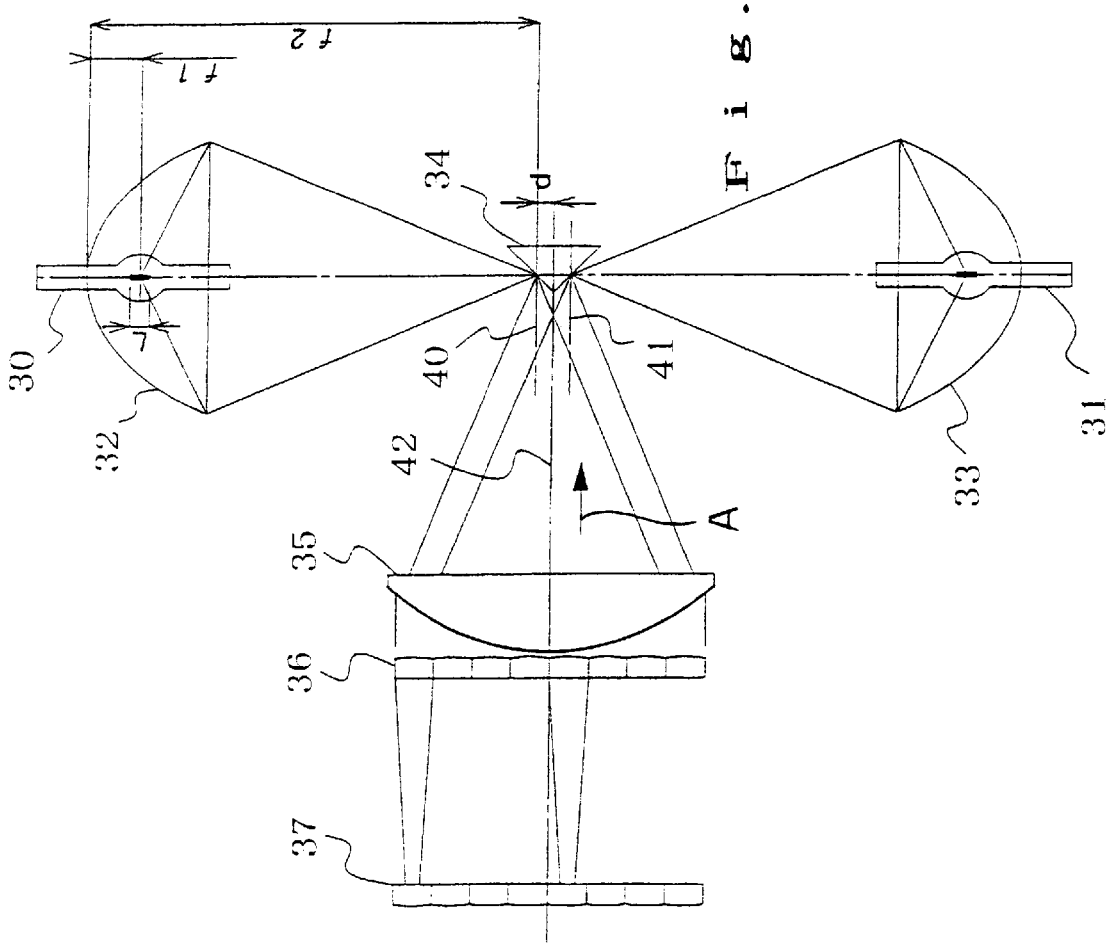

FIGS. 2(a) to 2(c) are explanatory diagrams of the optical illumination apparatus of this embodiment.

That is, FIG. 2(a) is a partial structural drawing of the optical illumination apparatus 39, FIG. 2(b) is a modal diagram of only a focused spot, which is derived from the light source 30 and is viewed from the direction shown by an arrow A in FIG. 2(a), and FIG. 2(c) is a graph showing the intensity distribution of the focused spot.

It is assumed that an emitting portion of the light source 30 is cylindrical, the length of the emitting portion at the time of locating the longitudinal direction of the emitting portion in the direction of the optical axis 40 is L, the distance between an apex of the ellipsoidal mirror 32 and a first focus is f1, and the distance between the apex of the ellipsoidal mirror 32 and the second focus is f2.

The emitting portion of the light source 30 is located near the first focus of the ellipsoidal mirror 32. A focused spot like the spot shown in FIG. 2(b) is formed at the second focal point of the ellipsoidal mirror 32.

Here, a paraxial magnification m of the ellipsoidal mirror 32 is:

m=f2/f1

A focused spot diameter D is:

D=Lm

As for the focused spots formed near the optical axis 42 from the light sources 30 and 31, the optical loss caused by the eclipse in the focused spot on the reflecting surface does not arise by constructing the optical illumination apparatus so that the eccentricity d against the optical axis 42 may become D/2 or more. Nevertheless, if the eccentricity d is lower than D/2, the optical loss arises. Its mode is shown in FIG. 2(b). A part except a hatched area of the focused spot is the optical loss.

Nevertheless, as the eccentricity d increases against the optical axis 42, an incident angle of an incident light beam to the condenser lens 35 increases, and hence the efficiency of the light illuminating the liquid crystal panel 44 decreases.

Therefore, it can be seen that, if the length of an emitting portion of a light source is a constant value, an optimum eccentricity in which the efficiency of light illuminating a liquid crystal panel is high exists.

With paying attention to the intensity distribution of the focused spot, the intensity becomes high as it goes to the center of the focused spot as shown in FIG. 2(c). This is because the density of the light beam becomes high in the central portion of the focused spot since the focused spot becomes a linear light source, whose length is D by the length L of the emitting portion of the light source being multiplied by m, and the linear light sources are formed with being superimposed in the circumferential direction.

Figure 3:
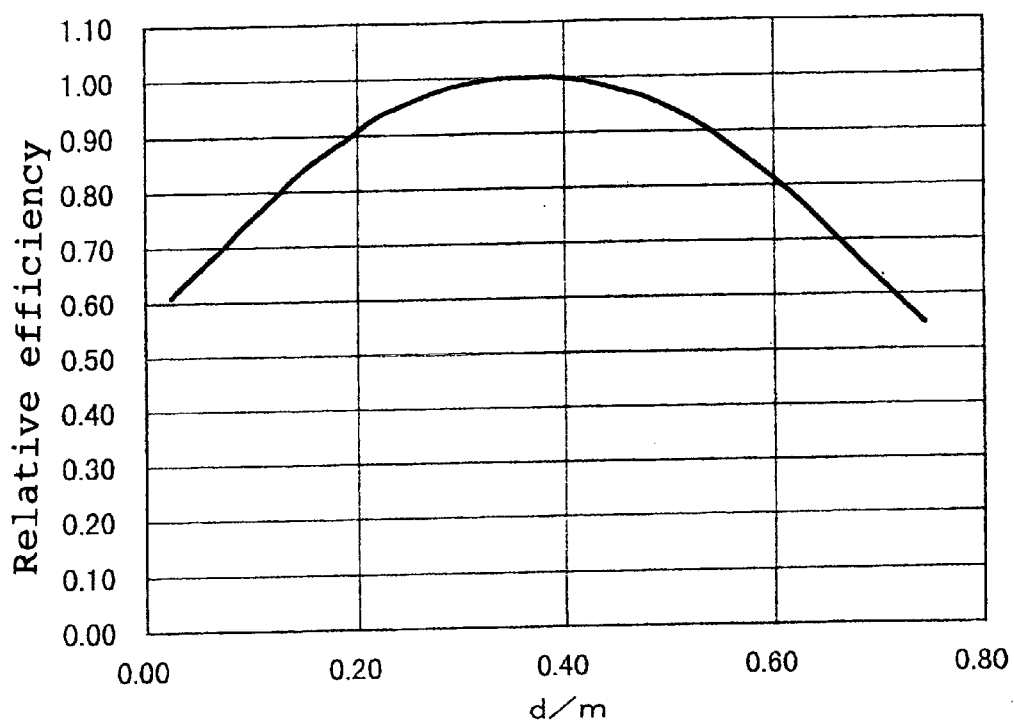
FIG. 3 is a graph showing the relation between d/m and the relative efficiency of light utilization of the optical illumination apparatus.

FIG. 3 shows the efficiency of light utilization of the optical illumination apparatus versus the eccentricity d/m.

In FIG. 3, the horizontal axis is d/m that shows the eccentricity d versus the paraxial magnification m of the ellipsoidal mirror, and the vertical axis is the relative efficiency of light utilization of the optical illumination apparatus.

In addition, the efficiency of light utilization is obtained with constructing the optical illumination apparatus, which is shown in FIG. 1, and in which the length L of the emitting portion of the light sources 30 and 31 is 1–1.8 mm, and the size of the liquid crystal panel 44 is 0.9–1.8 inches.

From FIG. 3, it can be seen that the efficiency becomes the highest when d/m that shows the eccentricity is 0.38. In consideration of the accuracy and performance dispersion of members configuring the optical illumination apparatus 39, the efficiency becomes high within the range of the eccentricity d expressed in the following in equal equation in case of defining as a practical range such a range that the efficiency remains of 90% or more of the highest efficiency:

$$0.19\ m \leq d \leq 0.55\ m \qquad \text{(Equation 1)}$$

In this manner, in case an optical illumination apparatus like the apparatus shown in FIG. 1 with using a plurality of light sources is constructed, the efficiency of light utilization of the optical illumination apparatus becomes the highest when the eccentricity d of respective optical axes, which correspond to the plurality of light sources respectively, against the optical axis of the optical illumination apparatus is within the range expressed in equation 1.

Figure 4:
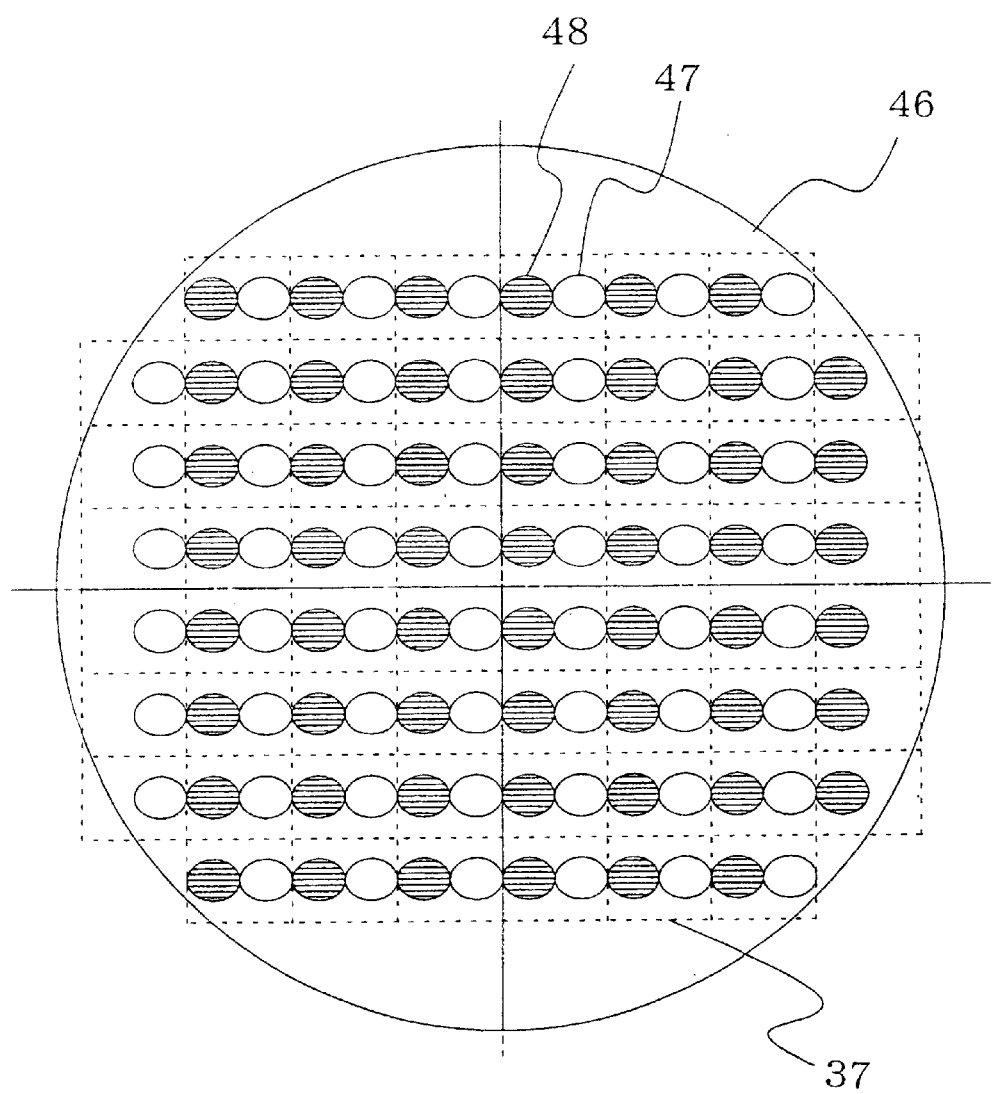
FIG. 4 is a modal diagram showing minute light source images of the plurality of light sources on a pupil surface of a projection lens in the optical illumination apparatus according to the first embodiment of the present invention.

FIG. 4 is a schematic modal diagram showing multiple minute light source images of the light sources 30 and 31 that are formed on the pupil surface 46 of the projection lens 45. Although the minute light source images are rendered in the same size regardless locations in FIG. 4 for simple drawing, actually, there is such a tendency that sizes of the light source images in a peripheral part of the pupil surface 46 become smaller than those in a central part.

With corresponding to the array direction of the plurality of light sources 30 and 31, multiple minute light source images 47 and 48 of the light sources 30 and 31 are alternately formed respectively. Dotted lines 37 show relative positional relation between the multiple minute light source images and the second lens array plate 37. This pupil surface 46 is projected as a secondary light source on a screen (not shown).

Figures 14A, 14B:
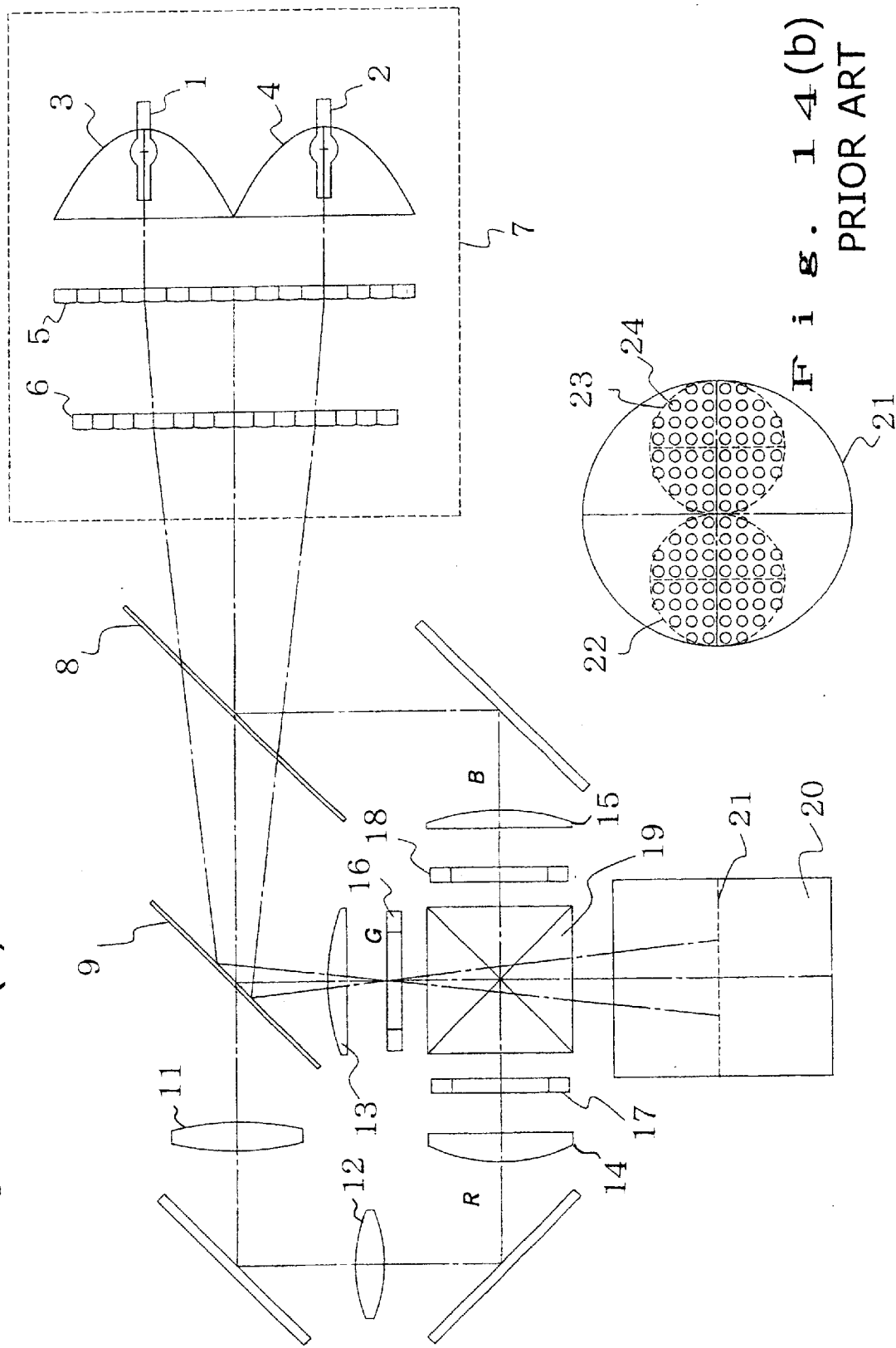
FIG. 14(a) is a structural drawing of a conventional optical illumination apparatus and an image projection apparatus.
FIG. 14(b) is a drawing showing a mode of light source images formed on a pupil surface of a projection lens in the conventional image projection apparatus.

It can be seen that, with comparing the images in FIG. 4 with the multiple minute light source images on the pupil surface of the projection lens in the conventional optical illumination apparatus shown in FIGS. 14(a) and 14(b), the multiple minute light source images in FIG. 4 corresponding to the two light sources are formed symmetrically about the optical axis.

If an optical illumination apparatus is configured by using a lens array plate, minute light source images are discretely formed on a pupil surface of a projection lens. Nevertheless, the minute light source images corresponding to a plurality of light sources are formed in gaps between the minute light source images. It can be seen that, owing to this, the minute light source images are thickly formed on the entire pupil surface of the projection lens.

In this manner, it is possible to lead the light from the plurality of light sources to the projection lens without decreasing the F-number of the projection lens.

In addition, the illumination lens 38 is a lens for illuminating the liquid crystal panel 44 with superimposing the light outgoing from respective lens elements of the second lens array plate 37 on the liquid crystal panel 44. Nevertheless, it can be also performed not to locate the illumination lens 38 by making the action be performed through adequately decentering the lens elements of the first and second lens array plates 36 and 37.

Although each lens element of the second lens array plate 37 is rectangular, an aperture shape can be adequately changed so as to increase the efficiency of light utilization.

As described above, in an optical illumination apparatus that converges and synthesizes the light from a plurality of light sources near an optical axis of an optical illumination apparatus, it is possible to increase the efficiency of light utilization of the optical illumination apparatus by regulating within constant values the eccentricity d of the optical axes of the light from the plurality of light sources against the optical axis of the optical illumination apparatus.

In addition, it is possible to make the uniformity of luminance and color on a screen good since it is possible to form the multiple minute light source images, which are formed on a pupil surface of a projection lens, nearly symmetrically about the optical axis even if the plurality of light sources are used.

Therefore, it is possible to configure the optical illumination apparatus where the efficiency of light utilization is high and the uniformity is good. In addition, it is possible to configure an image projection apparatus that is small low-cost and highly efficient, since it is possible to synthesize the plurality of light sources without decreasing the F-number of the projection lens.

(Embodiment 2)

Figure 5:
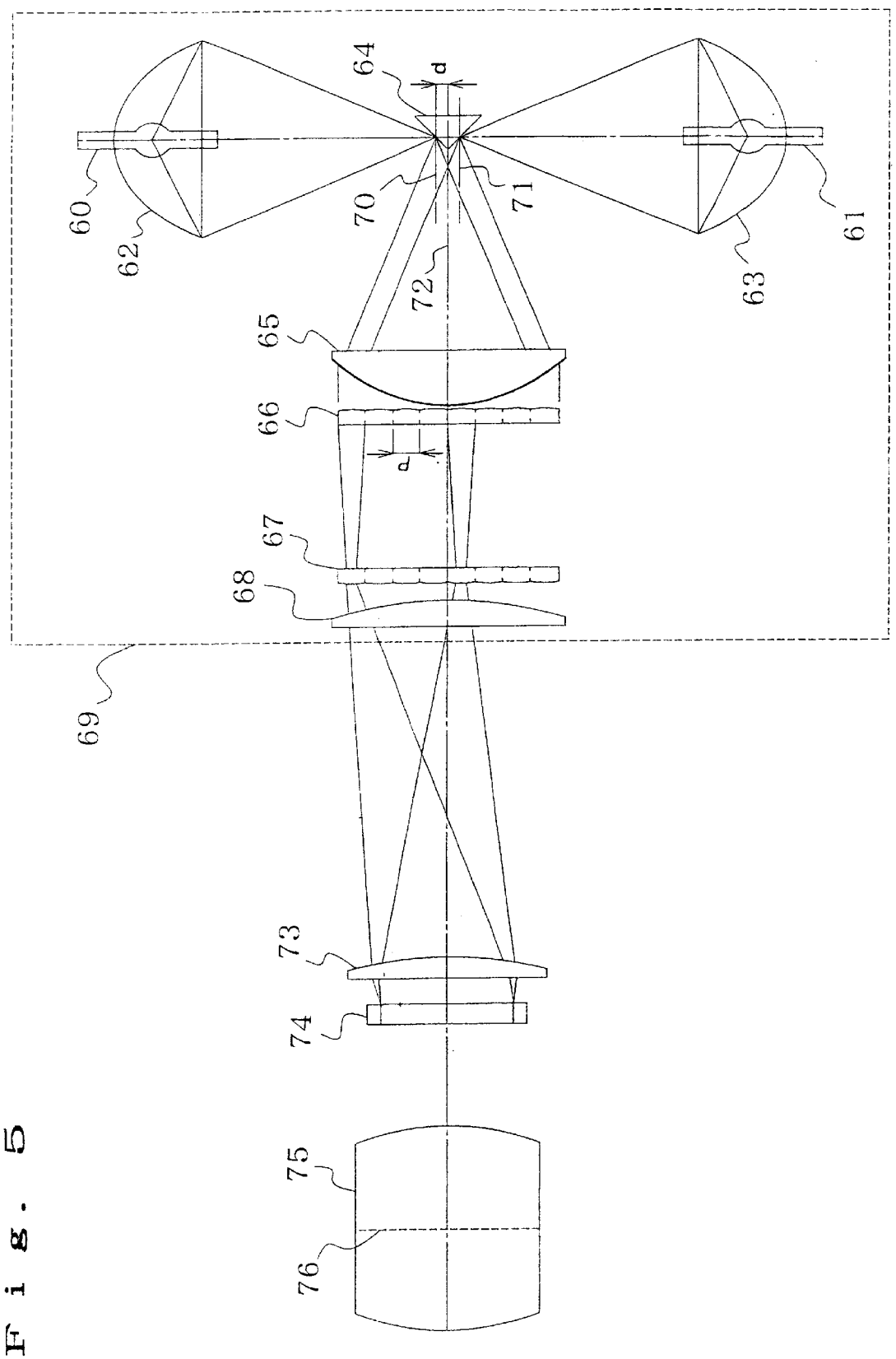
FIG. 5 is a structural drawing of an optical illumination apparatus according to a second embodiment of the present invention.

FIG. 5 shows the configuration of a second optical illumination apparatus according to the present invention.

Here, a liquid crystal panel modulating light with using polarization is used as an image forming means.

As shown in FIG. 5, reference numbers 60 and 61 are lamps that are light sources, and reference numbers 62 and 63 denote ellipsoidal mirrors. Reference number 64 denotes a reflecting prism that is a reflecting means, and 65 denotes a condenser lens that is a light converging means. Reference number 66 denotes a first lens array plate, and 67 denotes a second lens array plate. Reference number 68 denotes an illumination lens, and 69 denotes a second optical illumination apparatus of the present invention. Reference numbers 70 and 71 denote optical axes of light from the plurality of light sources 60 and 61, and 72 denote an optical axis of the optical illumination apparatus 69.

Reference symbol d denotes an eccentricity of the optical axis 70 of light from the light source 60 against the optical axis 72. An eccentricity of the optical axis 71 also is d.

In addition, reference number 73 denotes a field lens, 74 denotes a liquid crystal panel, 75 denotes a projection lens, and 76 denotes a pupil surface of the projection lens 75.

In this embodiment, the difference from that in FIG. 1 is that a pitch p of lens elements of the first lens array plate 66 is defined. Here, reference symbol p denotes a pitch of the lens elements of the first lens array plate 66 that are arrayed in the direction parallel to a plane including the respective optical axes 70 and 71 of the light from the plurality of light sources 60 and 61.

Light emitted from the lamps 60 and 61 configured by metal halide lamps, ultra-high pressure mercury lamps, or xenon lamps is converged by the ellipsoidal mirrors 62 and 63 corresponding to the light from the respective lamps 60 and 61. Then, the light forms a focused spot near each second focus of the ellipsoidal mirrors 62 and 63.

This optical illumination apparatus 69 of this embodiment is configured so that the respective focused spots of the ellipsoidal mirrors 62 and 63 may be formed near the optical axis 72 of the optical illumination apparatus 69. The reflecting prism 64 having reflecting surfaces corresponding to the number of light sources is located near the focused spots, and the reflecting prism 64 changes the optical axes 70 and 71 in the predetermined direction. The optical axes 70 and 71 are decentered by the eccentricity d respectively against the optical axis 72 of the optical illumination apparatus 69.

In this manner, the light from the light sources 60 and 61 is converged near the optical axis 72 of the optical illumination apparatus 69, and is synthesized. The two focused spots are formed with sandwiching the optical axis 72 near respective optical axes 70 and 71. The light from the reflecting prism 64 is transformed into nearly parallel light by the condenser lens 65.

The nearly parallel light from the condenser lens 65 enters into the first lens array plate 66 configured by a plurality of lenses. The light beams entering into the first lens array plate 66 are divided into multiple light beams. The multiple light beams divided are converged on the second lens array plate 67 configured by a plurality of lenses. Multiple minute light source images of the plurality of light sources 60 and 61 are formed on the second lens array plate 67.

Each focal length of lens elements of the first lens array plate 66 is made to be equal to the gap between the first lens array plate 66 and second lens array plate 67. Each lens element of the first lens array plate 66 has an aperture shape similar to that of the liquid crystal panel. Each focal length of lens elements of the second lens array plate 67 is determined so that a surface of the first lens array plate 66 may become nearly conjugate with a surface of the liquid crystal panel 74.

The illumination lens 68 is a lens for illuminating the liquid crystal panel 74 with the light outgoing from respective lens elements of the second lens array plate 67 with superimposing the light on the liquid crystal panel 74. Furthermore, its focal length is the distance between a surface of the illumination lens 68 and a surface of the liquid crystal panel 74.

In addition, each lens element of the first and second lens array plates 66 and 67 is adequately decentered so as to efficiently illuminate the liquid crystal panel 74. Multiple light beams outgoing from the second lens array plate 67 are superimposed on the liquid crystal panel 74, and highly efficiently and uniformly illuminates the liquid crystal panel 74.

The field lens 73 is a lens for converging the light, with which the liquid crystal panel 74 is illuminated, on the pupil surface 76 of the projection lens 75. The pupil surface 76 of the projection lens 75 is nearly conjugate with a surface of the second lens array plate 67. The projection lens 75 projects an optical image, which is formed in the liquid crystal panel 74, on a screen (not shown).

Here, the explanatory diagram of the optical illumination apparatus synthesizing the light from the plurality of light sources shown in FIGS. 2(*a*) to 2(*c*) will be referred to.

At a second focal point of each ellipsoidal mirror, a focused spot, whose diameter is D as shown in FIG. 2(b), is formed. As for the focused spots from the light sources 60 and 61 that are formed near the optical axis 72, the optical loss caused by the eclipse in each focused spot on the reflecting surface does not arise by constructing the optical illumination apparatus so that the eccentricity d against the optical axis 72 may become D/2 or more. Nevertheless, if the eccentricity d is lower than D/2, the optical loss arises. A part except a hatched area of the focused spot is the optical loss.

Nevertheless, as the eccentricity d increases against the optical axis 72, an incident angle of a light beam incident to the condenser lens 65 increases, and hence the efficiency of the light illuminating the liquid crystal panel 74 decreases. Therefore, it can be seen that, if the length of an emitting portion of a light source is a constant value, an optimum eccentricity where the efficiency of light illuminating an liquid crystal panel is high exists.

Figure 6A:
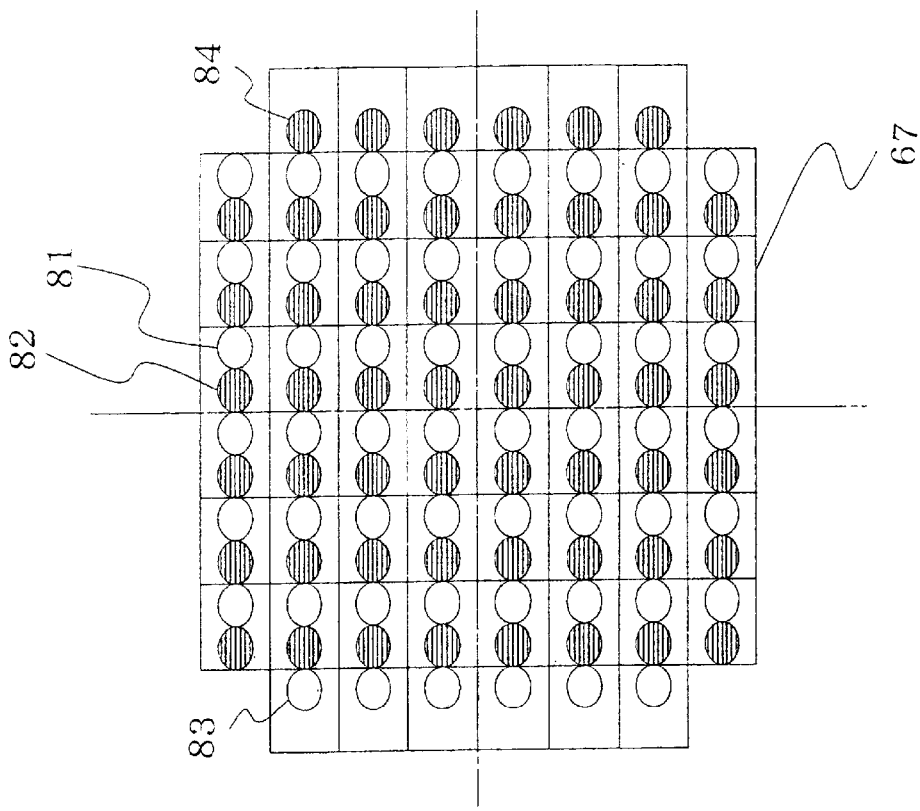
FIG. 6(a) is a mode of light beams entering into a first lens array plate.
Figure 6B:
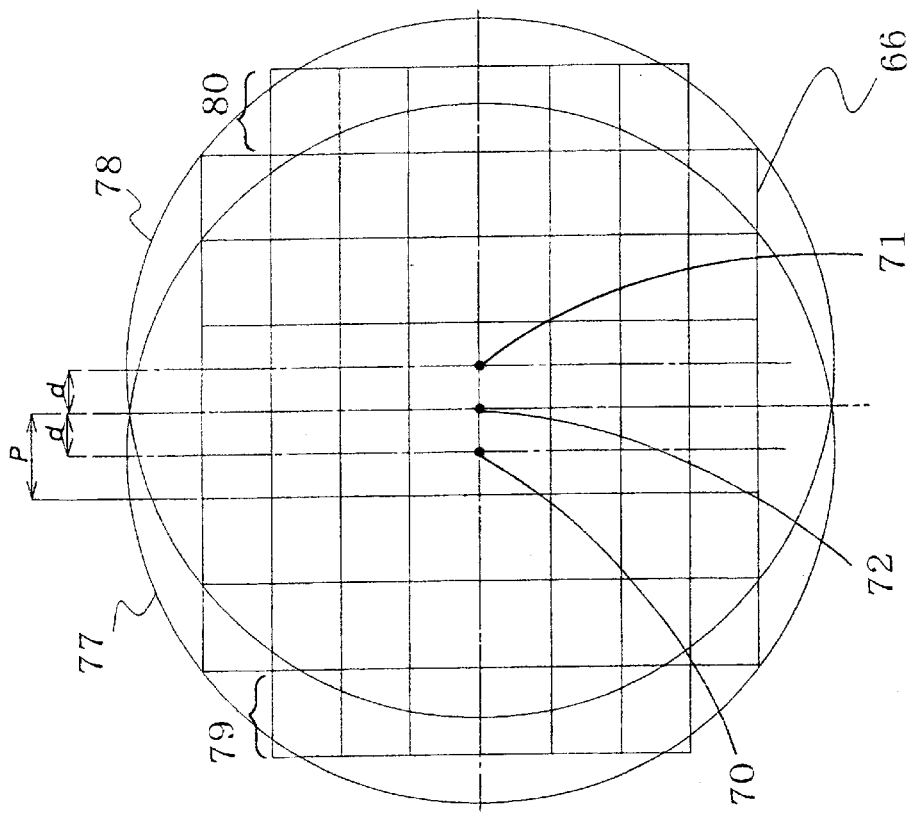
FIG. 6(b) is a mode of light beams entering into a second lens array plate.

FIGS. 6(a) and 6(b) show modes of light beams with which the first and second lens array plates 66 and 67 are illuminated.

Thus, FIG. 6(a) shows a mode of light beams with which the first lens array plate 66 is illuminated, and FIG. 6(b) schematically shows a mode of light beams with which the second lens array plate 67 is illuminated.

In FIG. 6(a), reference numbers 77 and 78 denote diameters of light beams which are obtained by the light from the respective light sources 60 and 61 outgoing from the condenser lens 65, and with which the first lens array plate is illuminated. Reference symbol P shows the lens element pitch p of the lens array plate.

With depending on the relation between the eccentricity d of the optical axis 70 of the light from the light source 60 and the pitch P, the diameter 77 of the light beam with which the first lens array plate 66 is illuminated is changed. As the eccentricity d becomes large, a superimposed area of the light beams having the diameters 77 and 78 becomes small, and hence the optical loss increases.

In this embodiment, as shown in FIG. 6(a), the optical illumination apparatus 69 is constructed so that lens element columns 79 and 80 also, which are arrayed in a peripheral part of the first lens array plate 66, can be illuminated with at least any one of two light beams having the illuminating light beam diameters 77 and 78.

Owing to this, minute light source images formed on the second lens array plate 67 is formed as shown in FIG. 6(b). These minute light source images are two-dimensionally formed on the pupil surface of the projection lens, and a product of luminance and an area of each minute light source image determines the brightness of a spot on a screen.

Furthermore, in FIG. 6(b) also, similarly to the case in FIG. 4, minute light source images are rendered in the same size regardless locations for simple drawing. The same applies to FIG. 10 that is referred to in a third embodiment described later.

Since the light beam from the light source 60 enters into the peripheral lens elements 79 in the column wise direction, only light source images 83 from the light source 60 are formed on the peripheral lens elements of the second lens array plate 67.

Similarly, since the light beam from the light source 61 enters into the peripheral lens elements 80 in the column wise direction, only light source images 84 from the light source 61 are formed on the peripheral lens elements of the second lens array plate 67. A total area of the minute light source images from one light source that are formed on the peripheral lens elements changes with depending on the relation between the pitch p and eccentricity d. The larger the area is, the higher the efficiency of light utilization of the optical illumination apparatus is.

Therefore, the efficiency of light utilization changes according to the relation between the eccentricity d and the lens element pitch p of the lens array plate. Hence, there is the optimum relation in which the efficiency of light utilization becomes high.

Figure 7:
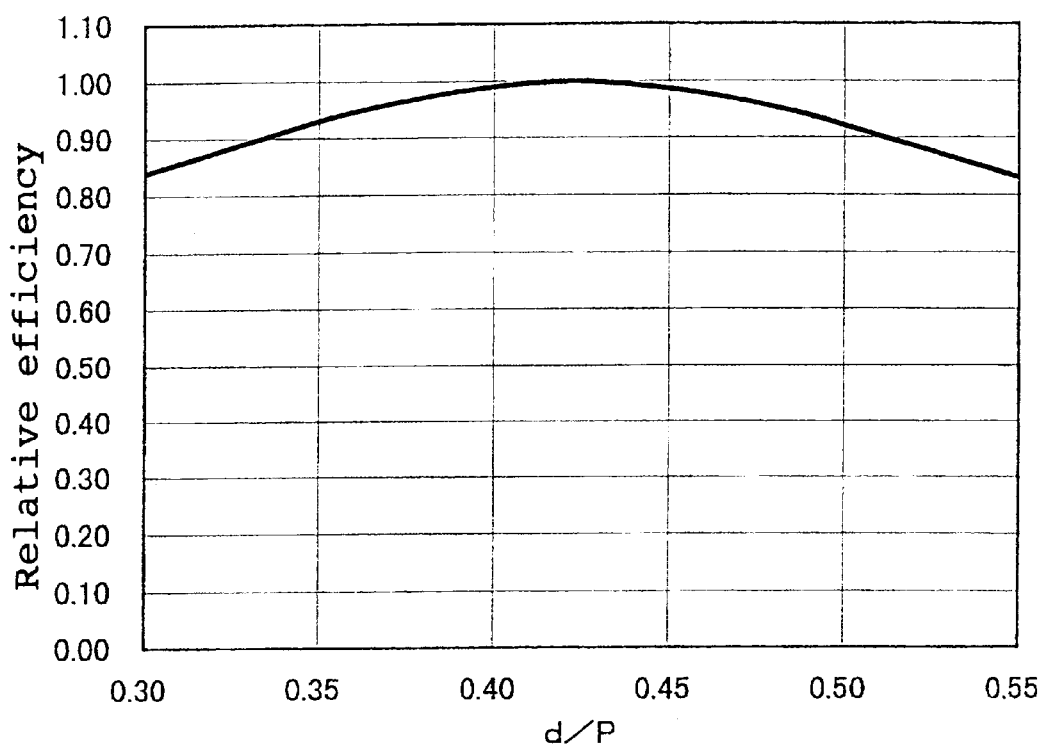
FIG. 7 is a graph showing the relative efficiency of light utilization versus the eccentricity d and the lens element pitch P of the first lens array plate.

FIG. 7 is a graph showing the relative efficiency of light utilization of the optical illumination apparatus versus the relation between the eccentricity d and a lens element pitch p of the first lens array plate 66.

In FIG. 7, the horizontal axis is d/p that shows the eccentricity d versus the lens element pitch d, and the vertical axis is the relative efficiency of light utilization of the optical illumination apparatus.

The efficiency of light utilization is obtained with constructing the optical illumination apparatus, which is shown in FIG. 5, and in which the length L of the emitting portions of the light sources 60 and 61 is 1–1.8 mm, and the size of the liquid crystal panel 74 is 0.9–1.8 inches.

It can be seen from FIG. 7 that the efficiency becomes the highest when d/p is 0.42.

In consideration of the accuracy and performance dispersion of members constructing the optical illumination apparatus 69, the efficiency of light utilization becomes high in the relation between the eccentricity d and the lens element pitch p that is expressed in the following in equal equation in case of defining as a practical range such a range that the efficiency drops to 90% of the highest efficiency:

$$0.33 \leq d/p \leq 0.52 \qquad \text{(Equation 2)}$$

where p is the pitch of the lens elements of the first lens array plate 66.

In addition, the lens element pitch p, as shown in FIG. 6(a), is defined as an array gap of lens elements arrayed in the direction parallel to the shifted direction of respective optical axes 70 and 71 from the optical axis 72 on the first lens array plate 66.

In this manner, in the case when an optical illumination apparatus like the apparatus shown in FIG. 5 by using a plurality of light sources is constructed, the efficiency of light utilization of the optical illumination apparatus becomes the highest when the relation between the eccentricity d of respective optical axes, which correspond to the plurality of light sources respectively, and the lens element pitch p of the first lens array plate 66 is within the range expressed by equation 2.

With viewing a mode of minute light source images shown in FIG. 6(b), the mode seems as if the efficiency of light utilization were the highest when d/p is 0.5. Nevertheless, as described above, this is not true. Thus, in fact, the efficiency of light utilization is the highest when d/p is 0.42, as described in FIG. 7. Its reason is as follows. Thus, in FIG. 6(b), similarly to FIG. 4, the minute light source images are rendered in the same size regardless locations for simple drawing. In fact, there is such a tendency that the light source images in a peripheral part of the second lens array plate 67 are smaller than those in a central part. Due to such a tendency, if the light source images in the peripheral part are set to be as large as possible, the light source images in the central part extend off respective lens elements, and hence the optical loss increases. Then, so as to reduce the extending-off part, it is necessary to make center locations of two light source images, which are formed on respective lens elements, further close by making the eccentricity d smaller than p/2. Nevertheless, if the eccentricity dis excessively decreased, in turn, the optical loss arises due to the eclipse of focused spots on the reflecting surfaces of the reflecting prism 64, as described in equation 1.

For this reason, the efficiency of light utilization becomes the highest when d/p is smaller than 0.5.

By the way, a mode of multiple minute light source images of the light sources 60 and 61 that are formed on the pupil surface 76 of the projection lens 75 is similar to the mode shown in FIG. 6(*b*). Thus, with corresponding to the array direction of the plurality of light sources 60 and 61, multiple minute light source images 81 and 82 of the light sources 60 and 61 are alternately formed respectively. This pupil surface 76 is projected as a secondary light source on a screen (not shown).

It can be seen that, with comparing the images in FIG. 5 with the multiple minute light source images on the pupil surface of the projection lens in the conventional optical illumination apparatus shown in FIGS. 14(*a*) and 14(*b*), the multiple minute light source images in FIG. 6(*b*) corresponding to the two light sources 60 and 61 are formed symmetrically about the optical axis 72.

If a optical illumination apparatus is configured by using a lens array plate, minute light source images are discretely formed on a pupil surface of a projection lens. Nevertheless, the minute light source images corresponding to the plurality of light sources are formed in gaps between the minute light source images. It can be seen that, owing to this, the minute light source images are minutely formed on the entire pupil surface 76 of the projection lens 75.

In this manner, it is possible to lead the light from the plurality of light sources to the projection lens without decreasing the F-number of the projection lens.

In addition, the illumination lens 68 is a lens for illuminating the liquid crystal panel 74 with superimposing the light, outgoing from respective lens elements of the second lens array plate 67, on the liquid crystal panel 74. Nevertheless, it can be also performed not to allocate the illumination lens 68 by making the action be performed through adequately shifting the lens elements of the first and second lens array plates 66 and 67.

Although each lens element of the second lens array plate 67 is rectangular, an aperture shape can be adequately changed so as to increase the efficiency of light utilization.

As described above, in an optical illumination apparatus that converges and synthesizes light from a plurality of light sources near an optical axis of the optical illumination apparatus, it is possible to increase the efficiency of light utilization of the optical illumination apparatus by regulating within constant relational values the eccentricity d of optical axes of the light from the plurality of light sources against the optical axis of the optical illumination apparatus and a lens element pitch p of a first lens array plate.

In addition, it is possible to make the uniformity of luminance and color on a screen good since it is possible to form multiple minute light source images, which are formed on the pupil surface of the projection lens, nearly symmetrically about the optical axis even if the plurality of light sources are used.

Therefore, it is possible to configure the optical illumination apparatus where the efficiency of light utilization is high and the uniformity is good. In addition, it is possible to configure the image projection apparatus that is small lowcost and highly efficient, since it is possible to synthesize the plurality of light sources without decreasing the F-number of the projection lens.

(Embodiment 3)

Figure 8:
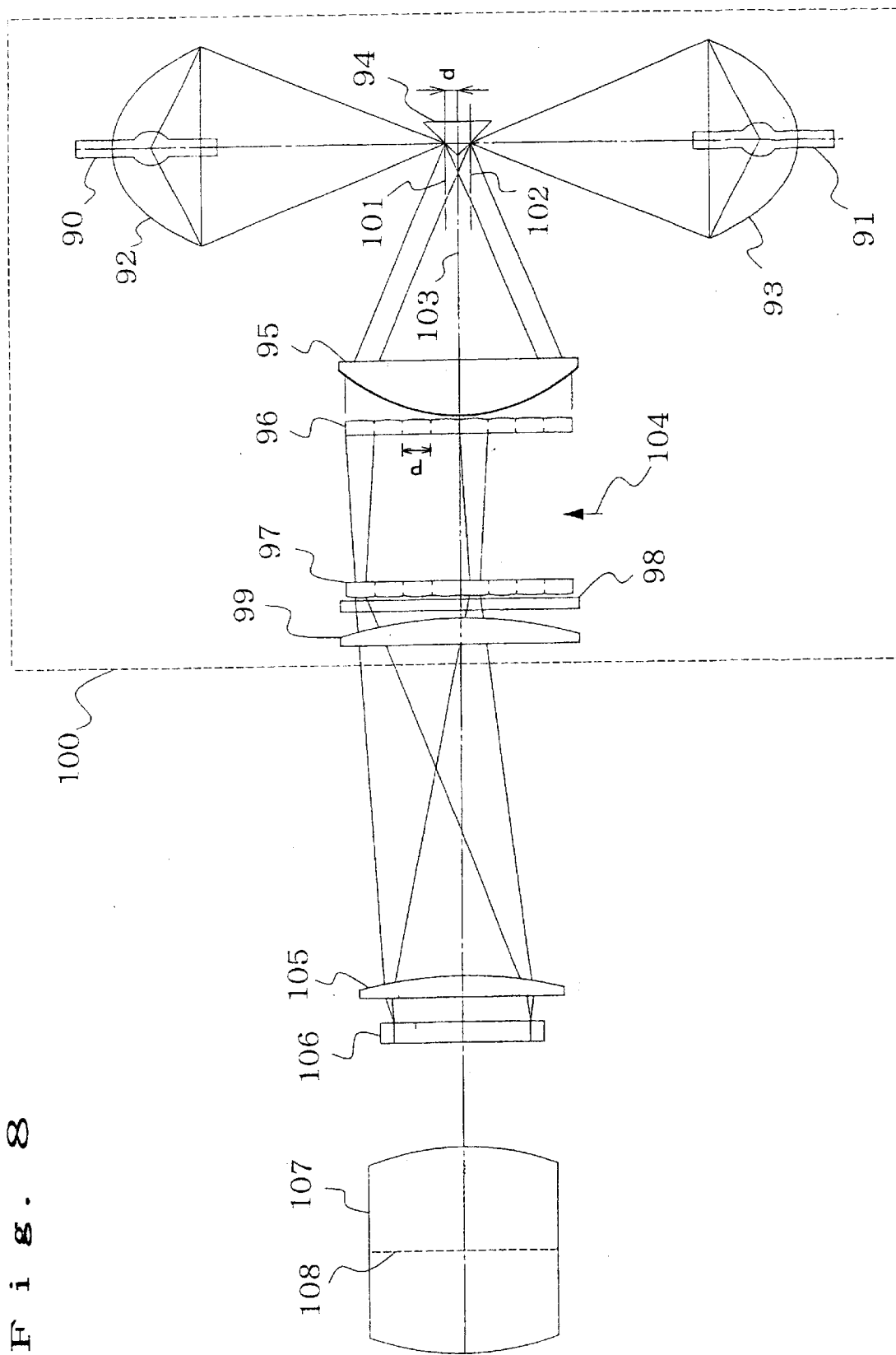
FIG. 8 is a structural drawing of an optical illumination apparatus according to a third embodiment of the present invention.

FIG. 8 is a structural drawing of a third optical illumination apparatus according to the present invention. Here, a liquid crystal panel that modulates light with using polarization is used as an image forming means.

In FIG. 8, reference numbers 90 and 91 denote lamps that are light sources, and reference numbers 92 and 93 denote ellipsoidal mirrors. Reference number 94 denotes a reflecting prism that is a reflecting means, and 95 denotes a condenser lens that is a converging means. Reference number 96 denotes a first lens array plate, and 97 denotes a second lens array plate. Reference number 99 denotes an illumination lens. In addition, the above configuration is similar to those in FIGS. 1 and 5.

Here, the difference from those in FIGS. 1 and 5 is that a polarization transforming optical member 98 is provided.

Figure 9A:
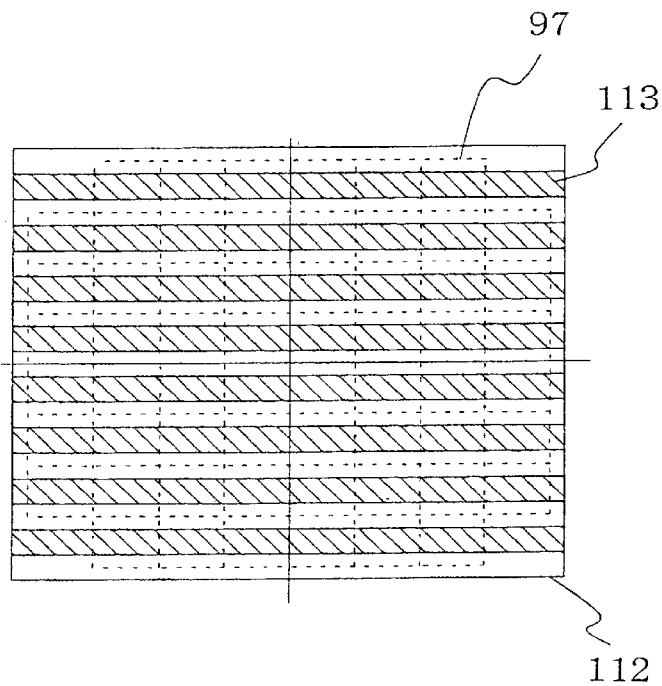
FIGS. 9(a) and 9(b) are structural drawings of polarization transforming optical members.
Figure 9B:
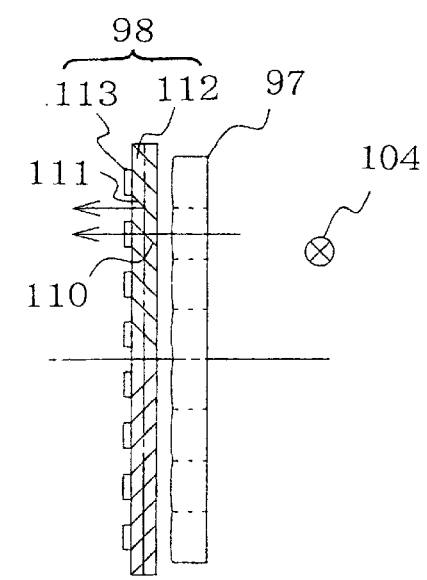

In addition, FIGS. 9(*a*) and 9(*b*) denote structural drawings of the polarization transforming optical member 98. FIG. 9(*a*) is a top view of the polarization transforming optical member 98, and FIG. 9(*b*) is a side view. The polarization transforming optical member 98 is configured by a polarization separating prism array 112, which is configured by many sets of a polarization separating film 110 and a reflective film 111 with alternatively forming many sets of them, and a half-wave plate 113 that is a polarization rotating means. Here, the polarization separating prism array 112 is an example of a polarization separating means of the present invention.

As shown in FIG. 8, reference number 100 denotes a third optical illumination apparatus of the present invention. Reference number 106 denotes a liquid crystal panel modulating light with using polarization, 105 denotes a field lens, 107 denotes a projection lens, and 108 denotes a pupil surface of the projection lens 107.

Light emitted from the lamps 90 and 91 is converged by the ellipsoidal mirrors 92 and 93 corresponding to the light from the respective lamps. Furthermore, the light forms focused spots at second focuses of the ellipsoidal mirrors 92 and 93 respectively. This optical illumination apparatus 100 is constructed so that the respective focused spots of the ellipsoidal mirrors 92 and 93 may be formed near an optical axis 103 of the optical illumination apparatus 100.

The reflecting prism 94 having reflecting surfaces corresponding to the number of light sources is located near the focused spots, and the reflecting prism 94 changes optical axes 101 and 102 in the predetermined direction. The optical axes 101 and 102 are decentered by an eccentricity d respectively against the optical axis 103 of the optical illumination apparatus 100.

In this manner, the light from the light sources 90 and 91 is converged near the optical axis 103 of the optical illumination apparatus 100, and is synthesized. The two focused spots are formed with sandwiching the optical axis 103 near respective optical axes. Here, a prism is used as a member constructing reflecting surfaces. The light from the reflecting prism 94 is transformed into nearly parallel light by the condenser lens 95.

The nearly parallel light from the condenser lens 95 enters into the first lens array plate 96 configured by a plurality of lenses. The light beam entering into the first lens array plate 96 is divided into multiple light beams. The multiple light beams divided are converged on the second lens array plate 97 configured by a plurality of lenses. Multiple minute light source images of the plurality of light sources 90 and 91 are formed on the second lens array plate 97.

Each focal length of lens elements of the first lens array plate 96 is made to be equal to a gap between the first lens array plate 96 and second lens array plate 97. Each lens element of the first lens array plate 96 has an aperture shape similar to that of the liquid crystal panel 106. Each focal length of lens elements of the second lens array plate 97 is determined so that a surface of the first lens array plate 96 may become nearly conjugate with a surface of the liquid crystal panel 106.

As for the focused spots from the light sources 90 and 91 that are formed near the optical axis 103, the optical loss caused by eclipses in the focused spots on the reflecting surfaces does not arise by constructing the optical illumination apparatus so that the eccentricity d against the optical axis 103 may become D/2 or more. Nevertheless, if the eccentricitydis lower than D/2, the optical loss arises.

Nevertheless, as the eccentricity d increases against the optical axis 103, an incident angle of a light beam incident to the condenser lens 95 increases, and hence the utilization efficiency of the light illuminating the liquid crystal panel 106 decreases.

In addition, as the eccentricity d becomes large, a superimposed area of respective light beams from the plurality of light sources that enter into the first lens array plate 96 becomes small, and hence the efficiency of light utilization decreases. Therefore, it can be seen that, if the length of an emitting portion of a light source is a constant value, an optimum eccentricity and a lens element pitch of the first lens array plate wherein the efficiency of the light illuminating an liquid crystal panel is high exist.

The efficiency of light utilization obtained with constructing the optical illumination apparatus that is shown in FIG. 8 and in which the length L of the emitting portions of the light sources 90 and 91 is 1–1.8 mm, and the size of the liquid crystal panel 106 is 0.9–1.8 inches paraxial becomes the highest when the relation between the magnification m of an ellipsoidal mirror and the eccentricity d is d/m =0.38.

In consideration of the accuracy and performance dispersion of members constructing the optical illumination apparatus 100, the efficiency becomes high when the paraxial magnification m of the ellipsoidal mirror and the eccentricity d meet the relation expressed in the following in equal equation in case of defining as a practical range such a range that the efficiency remains of 90% or more of the highest efficiency:

$$0.19\, m \leq d \leq 0.55\, m \tag{Equation 3}$$

In addition, it is assumed that p is a lens element pitch of the first lens array plate 96. Then, the efficiency of light utilization of the optical illumination apparatus becomes the highest when the relation between the lens element pitch p and eccentricity d is as follows:

$$0.33 \leq d/p \leq 0.52 \tag{Equation 4}$$

Furthermore, the lens element pitch p is shown in FIG. 8, and this is the same definition described in equation 2 with using FIG. 6(a).

Furthermore, in this embodiment, the eccentricity d and pitch p can be determined so that the relation expressed in equations 3 and 4 may be satisfied simultaneously, or can be determined so that any one of the two equations may be satisfied.

Multiple light beams outgoing from the second lens array plate 97 enter into the polarization separating prism array 112 where multiple minute polarization separating prisms are arrayed at a constant pitch in the direction 104 perpendicular to a plane including the optical axes 101 and 102 of the light from the plurality of light sources 90 and 91.

The reason why the array direction of the polarization separating prism array 112 is determined to be the direction 104 is to minutely form minute light source images on the pupil surface of the projection lens against the light sources corresponding to the plurality of light sources and two polarized components of respective light sources.

The minute polarization separating prisms are arrayed at an about half pitch of the lens pitch in the direction parallel to the direction 104 of the second lens array plate 97.

P-polarized light of light incident to a polarization separating prism passes through the polarization separating prism with the polarization separating film 110, and S-polarized light is reflected. The S-polarized light reflected impinges on the reflective film 111 that is adjacent to the polarization separating film 110, is reflected again, and enters into the half-wave plate 113. The half-wave plate 113 is located so that the polarized direction of incident light may be rotated at 90°, and transforms the S-polarized light into the P-polarized light.

In this manner, the light transformed by the polarization transforming optical member 98 from natural light to the light in one polarized direction enters into the illumination lens 99. The illumination lens 99 is a lens for superimposing the light outgoing from respective lens elements of the second lens array plate 97 on the liquid crystal panel 106 and illuminating the liquid crystal panel 106.

In addition, respective lens elements of the first and second lens array plates 96 and 97 are adequately decentered so as to efficiently illuminate the liquid crystal panel 106. Multiple light beams outgoing from the second lens array plate 97 are superimposed on the liquid crystal panel 106, and highly efficiently and uniformly enter into the liquid crystal panel 106.

Owing to the placement of the polarization transforming optical member 98, it is possible to use the light in one polarized direction that was lost, and hence it is possible to increase the number of polarized light beams illuminating the liquid crystal panel 106.

The field lens 105 is a lens for converging the light, illuminating the liquid crystal panel 106, on the pupil surface 108 of the projection lens 107. The pupil surface 108 of the projection lens 107 is nearly conjugate with a surface of the second lens array plate 97.

Figure 10:
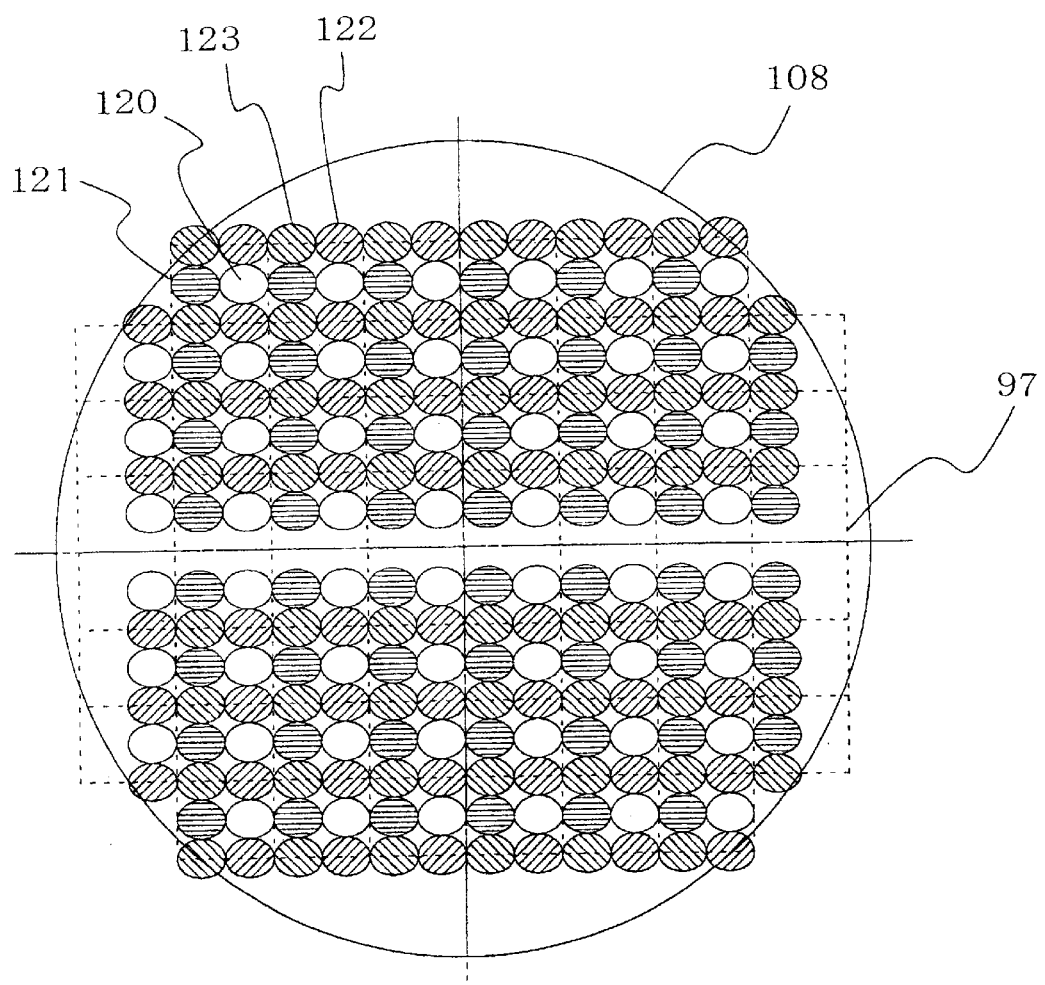
FIG. 10 is a modal diagram showing minute light source images of a plurality of light sources on a pupil surface of a projection lens in the optical illumination apparatus according to the third embodiment of the present invention.

FIG. 10 shows a mode of multiple minute light source images of the light sources 90 and 91 that are formed on the pupil surface 108 of the projection lens 107.

Multiple minute light source images 120 and 121 of polarized components that are components of the light sources 90 and 91 in one direction are alternately formed respectively in the direction 104 parallel to the plane including respective optical axes of the plurality of light sources 90 and 91.

Furthermore, minute light source images 122 and 123 of another polarized component are formed in the array direction (the direction perpendicular to the direction 104) of the polarization separating prism array 112 of the polarization transforming optical member 98. This pupil surface 108 is projected as a light source on a screen (not shown).

It can be seen that, with comparing the images in FIG. 10 with the multiple minute light source images on the pupil surface of the projection lens in the conventional optical illumination apparatus shown in FIGS. 14(a) and 14(b), the light source images of the two light sources 90 and 91 are formed symmetrically about the optical axis 103. If an optical illumination apparatus is constructed with using a lens array plate, minute light source images are discretely formed on a pupil surface of a projection lens. Nevertheless, the minute light source images corresponding to the plurality of light sources are formed in gaps between the minute light source images.

Furthermore, minute light source images of two polarized components corresponding to respective light sources are formed. It can be seen that, owing to this, the minute light source images are minutely formed on the entire pupil surface 108 of the projection lens 107. In this manner, it is possible to convert the light from the plurality of light sources in one polarization direction and to lead them to the projection lens without decreasing the F-number of the projection lens.

As described above, in an optical illumination apparatus converging and synthesizing light from a plurality of light sources near tan optical axis of the optical illumination apparatus, it is possible to increase the efficiency of light utilization of the optical illumination apparatus by regulating within constant values the eccentricity d of the optical axis of the light from the plurality of light sources against an optical axis of the optical illumination apparatus and the lens element pitch p of a first lens array plate.

In addition, it is possible to make the uniformity of luminance and color on a screen good since it is possible to form multiple minute light source images, which are formed on a pupil surface of a projection lens, nearly symmetrically about the optical axis even if the plurality of light sources are used.

Therefore, it is possible to configure the optical illumination apparatus where the efficiency of light utilization is high and the uniformity is good. In addition, it is possible to configure the image projection apparatus that is small low-cost and highly efficient, since it is possible to synthesize the plurality of light sources without decreasing the F-number of the projection lens.

Moreover, it is possible to configure the optical illumination apparatus and image projection apparatus that have remarkably high efficiency of light utilization, since the polarization transforming optical member transforming natural light into the polarized light in one direction is located.

(Embodiment 4)

Figure 11:
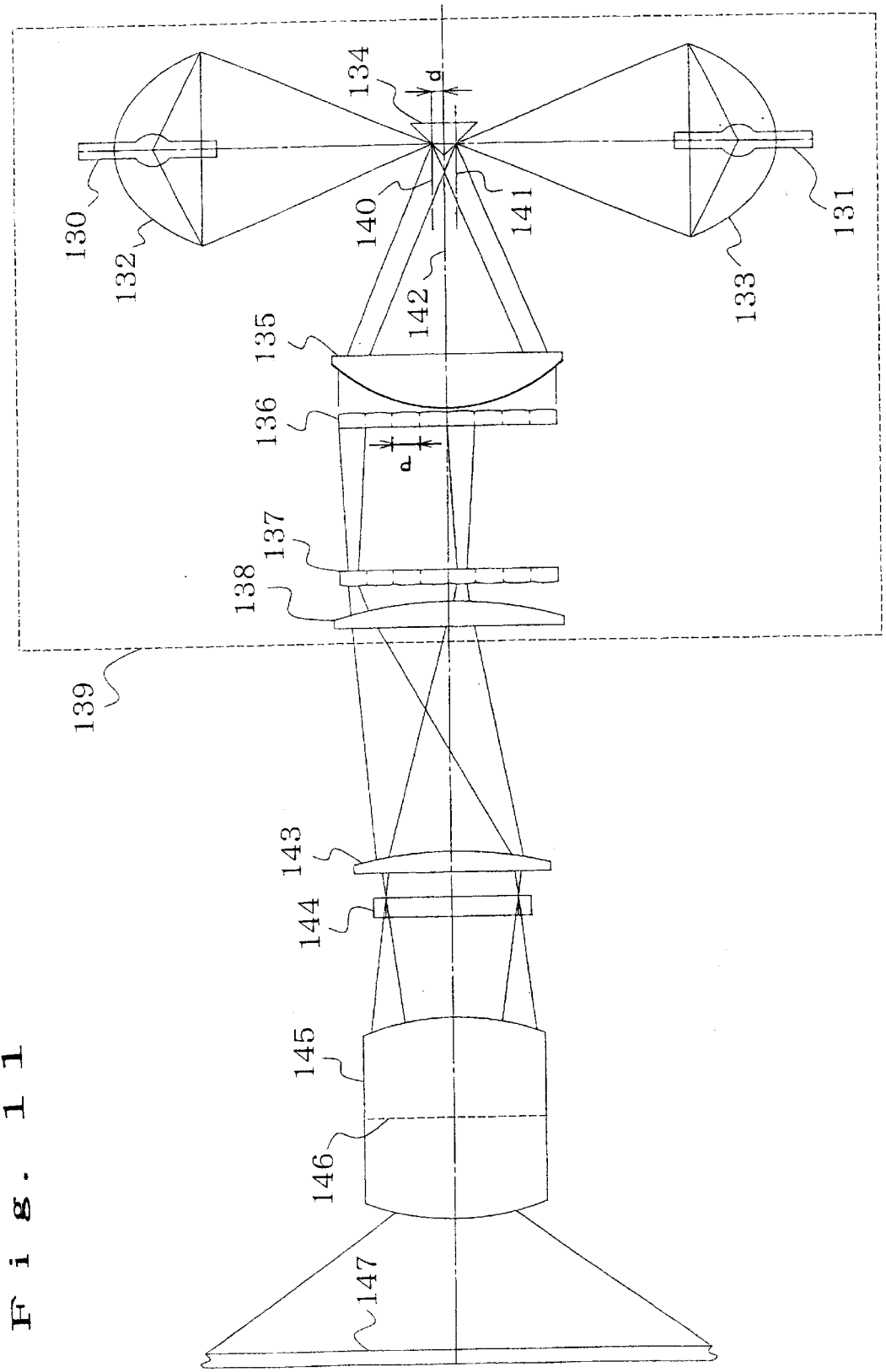
FIG. 11 is a structural drawing of an image projection apparatus according to a fourth embodiment of the present invention.

FIG. 11 is a structural drawing of a first image projection apparatus according to the present invention. Here, a liquid crystal panel that modulates light with using polarization and scattering is used as an image forming means.

In FIG. 11, reference numbers 130 and 131 denote lamps that are light sources, and reference numbers 132 and 133 denote ellipsoidal mirrors. Reference number 134 denotes a reflecting prism, and 135 denotes a condenser lens. Reference number 136 denotes a first lens array plate, and 137 denotes a second lens array plate. Reference number 138 denotes an illumination lens, and 139 denotes an example of an optical illumination apparatus.

In addition, reference numbers 140 and 141 denote optical axes of light beams from the light sources 130 and 131, and 142 denotes an optical axis of the optical illumination apparatus 139. Reference symbol d denotes an eccentricity of the optical axis 140 against the optical axis 142. An eccentricity of the optical axis 141 is also d. Reference number 144 denotes a liquid crystal panel, 145 denotes a field lens, and 147 denotes a screen.

In the configuration described above, light emitted from the optical illumination apparatus 139 passes through the field lens 143 and illuminates the liquid crystal panel 144. Blue, green, and red color filters are formed on each pixel of the liquid crystal panel 144.

The liquid crystal panel 144 is a panel in an active matrix method, and forms a color image by modulating light through controlling voltages, applied to pixels, according to a picture signal. The field lens 143 converges the light, illuminating the liquid crystal panel 144, on the pupil surface 146 of the projection lens 145. Colored light passing through the liquid crystal panel 144 is projected on the screen 147 with being enlarged by the projection lens 145.

As described above, in an optical illumination apparatus converging and synthesizing light from a plurality of light sources near an optical axis of the optical illumination apparatus, it is possible to extremely efficiently and uniformly illuminate the liquid crystal panel with the light from the plurality of light sources by regulating within constant values the eccentricity d of the optical axis of the light from the plurality of light sources against the optical axis of the optical illumination apparatus and a lens element pitch p of a first lens array plate.

Thus, the eccentricity d and pitch p can be determined so that the relation expressed in equations 1 and 2 may be satisfied simultaneously, or can be determined so that any one of the two equations may be satisfied.

Therefore, it is possible to configure the image projection apparatus where the uniformity is good and the efficiency of light utilization is high. It is possible to configure the image projection apparatus that is small and low-cost, since the image projection apparatus is constructed with using one liquid crystal panel.

(Embodiment 5)

Figure 12:
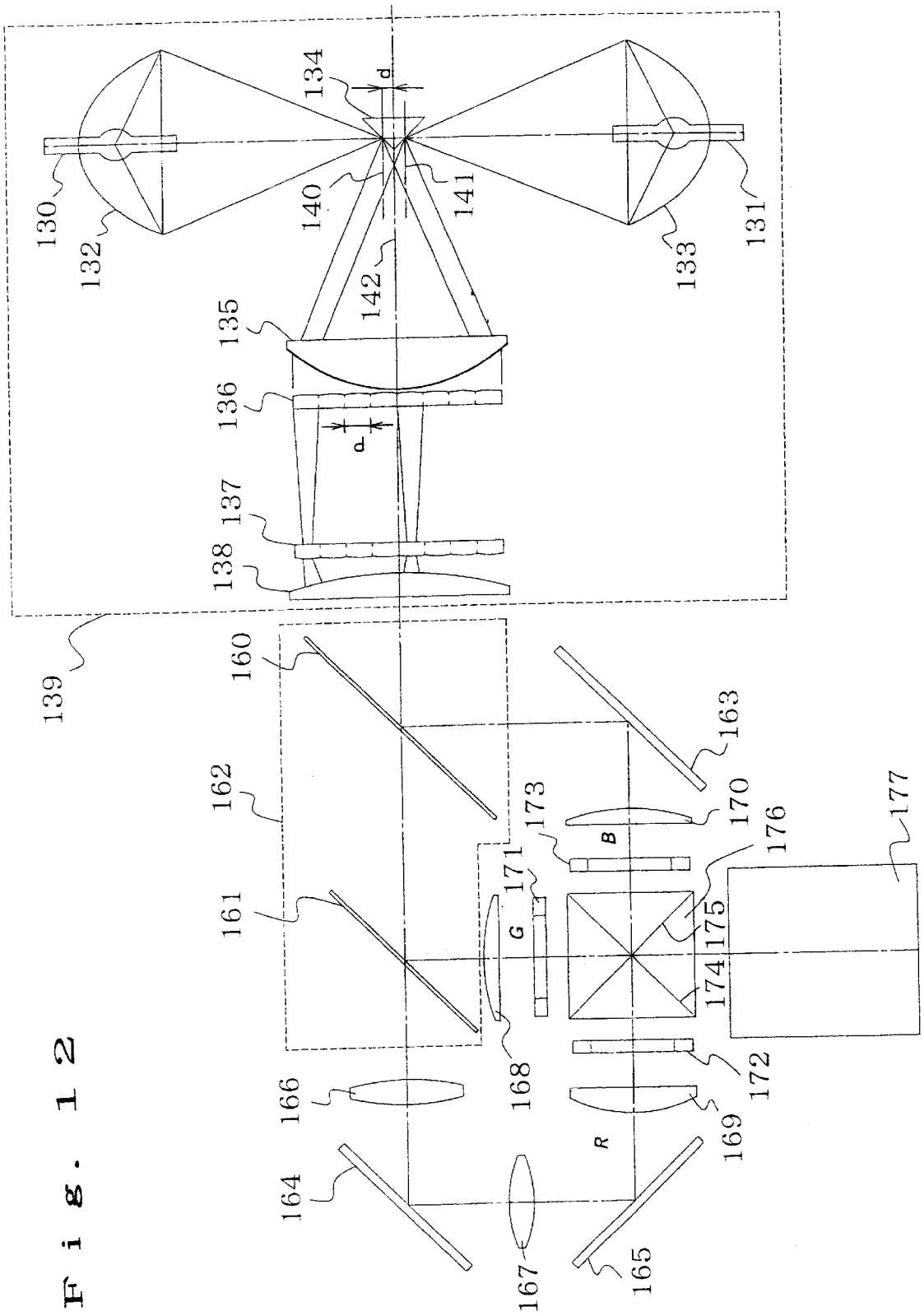
FIG. 12 is a structural drawing of an image projection apparatus according to a fifth embodiment of the present invention.

FIG. 12 is a structural drawing of a second image projection apparatus according to the present invention. Here, a liquid crystal panel that modulates light with using polarization is used as an image forming means.

In FIG. 12, reference numbers 130 and 131 denote lamps that are light sources, and reference numbers 132 and 133 denote ellipsoidal mirrors. Reference number 134 denotes a reflecting prism, and 135 denotes a condenser lens. Reference number 136 denotes a first lens array plate, and 137 denotes a second lens array plate. Reference number 138 denotes an illumination lens, and 139 denotes an example of an optical illumination apparatus.

In addition, reference numbers 140 and 141 denote optical axes of light beams from the light sources 130 and 131, and 142 denotes an optical axis of the optical illumination apparatus 139. Reference symbol d denotes an eccentricity of the optical axis 140 against the optical axis 142. An eccentricity of the optical axis 141 also is d. Reference numbers 160 and 161 denote blue-reflective and green-reflective dichroic mirrors respectively. Reference number 162 denotes a color separating optical means configured by dichroic mirrors, and reference numbers 163, 164, and 165 denote mirrors.

In addition, reference numbers 166 and 167 denote relay lenses, reference numbers 168, 169, and 170 denote field lenses, and 171 to 173 denote liquid crystal panels. Reference number 176 denotes a dichroic prism that is color synthesizing means. Reference numbers 174 and 175 denote blue-reflective and red-reflective dichroic mirrors constructing a dichroic prism 176, and 177 denotes a projection lens.

Light emitted from the optical illumination apparatus 139 enters into the color separating optical means 162. The light entering into the color separating optical means 162 is separated into blue, green, and red colored light by the blue-reflective dichroic mirror 160, and green-reflective dichroic mirror 161. The green and blue colored light passes through the field lenses 168 and 170 respectively, and enter into the liquid crystal panels 171 and 173 respectively.

The red colored light passes through the relay lenses 166 and 167 and is reflected by mirrors, and passes through the field lens 169 to enter into the liquid crystal panel 172. The three liquid crystal panels 171 to 173 are in the active matrix method, and form red, green, and blue images respectively by modulating light through controlling voltages, applied to pixels, according to a picture signal.

Colored light passing through the liquid crystal panels 171 to 173 is synthesized by the dichroic prism 176 that is a color synthesizing means, and projected on a screen (not shown) by the projection lens 177 with being enlarged.

As described above, in an optical illumination apparatus converging and synthesizing light from a plurality of light sources near an optical axis of the optical illumination apparatus, it is possible to extremely efficient and uniformly illuminate each liquid crystal panel with the light from the plurality of light sources by regulating within constant values the eccentricity d of the optical axis of the light from the plurality of light sources against the optical axis of the optical illumination apparatus and a lens element pitch p of a first lens array plate, as described in the above embodiment.

Therefore, it is possible to configure the image projection apparatus where the uniformity is good and the efficiency of light utilization is high.

It is possible to configure the image projection apparatus that is bright in high resolution, since the image projection apparatus is constructed with using three liquid crystal panels.

(Embodiment 6)

Figure 13:
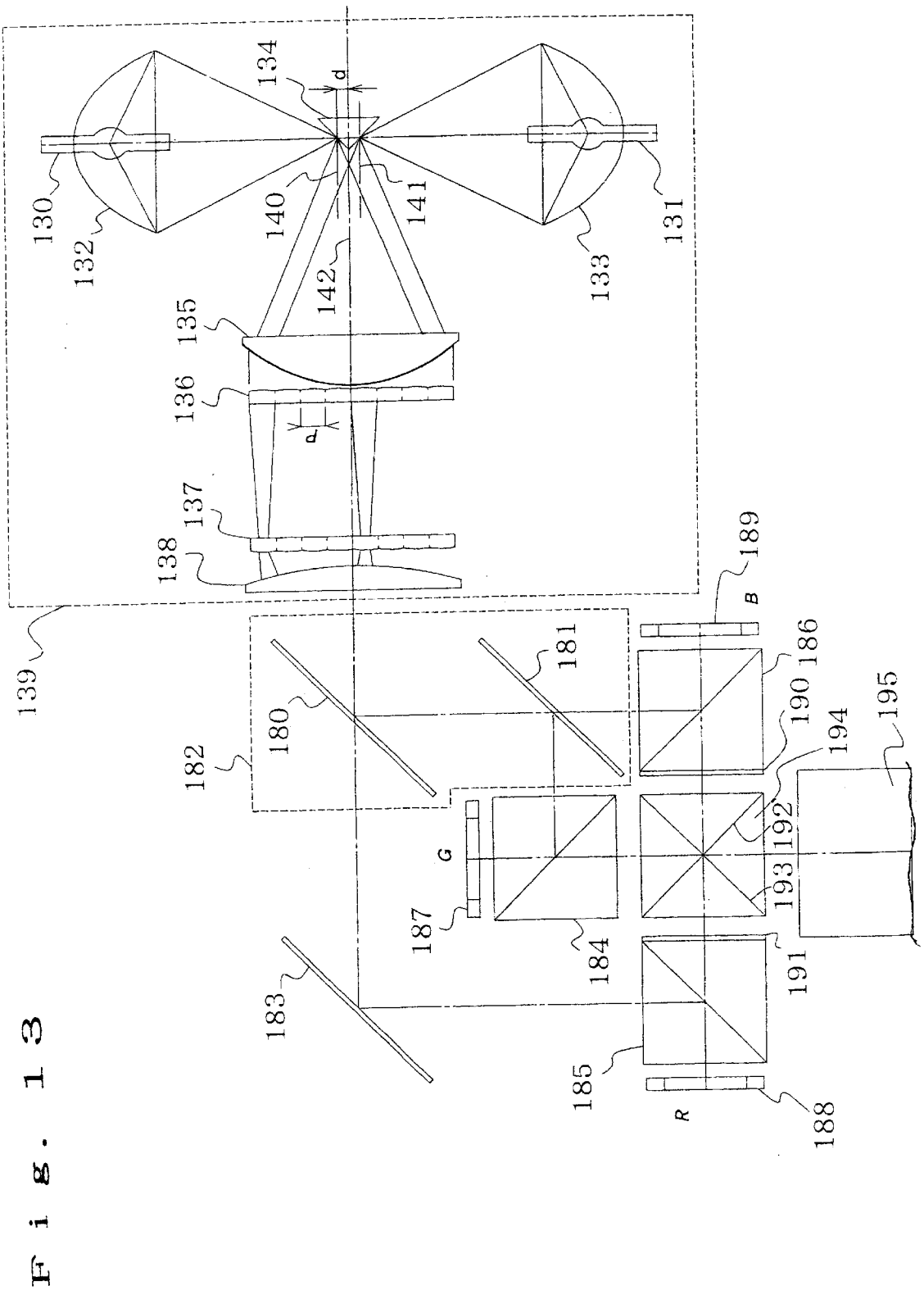
FIG. 13 is a structural drawing of an image projection apparatus according to a sixth embodiment of the present invention.

FIG. 13 is a structural drawing of a third image projection apparatus according to the present invention. Here, a liquid crystal panel that modulates light with using polarization is used as an image forming means.

In FIG. 13, reference numbers 130 and 131 denote lamps that are light sources, and 132 and 133 denote ellipsoidal mirrors. Reference number 134 denotes a reflective prism, and 135 denotes a condenser lens. Reference number 136 denotes a first lens array plate, and 137 denotes a second lens array plate. Reference number 138 denotes an illumination lens, and 139 denotes an example of an optical illumination apparatus of the present invention.

In addition, reference numbers 140 and 141 denote optical axes of light beams from the light sources 130 and 131, and 142 denotes an optical axis of the optical illumination apparatus 139. Reference symbol d denotes an eccentricity of the optical axis 140 against an optical axis 142. An eccentricity of the optical axis 141 also is d.

Reference numbers 180 and 181 denote red-pass and green-reflective dichroic mirrors respectively, and 182 denotes a color separating optical means configured by dichroic mirrors. Reference number 183 denotes a mirror, reference numbers 184 to 186 denote polarization separating prisms, and 187 to 189 denote reflective liquid crystal panels. Reference numbers 190 and 191 denote half-wave plates, and 194 denotes a dichroic prism that is a color synthesizing means.

In addition, reference numbers 192 and 193 denote respectively red-reflective and blue-reflective dichroic mirrors constructing the dichroic prism 194, and 195 denotes a projection lens.

Light emitted from the optical illumination apparatus 139 enters into the color separating optical means 182. The light entering into the color separating optical means 182 is separated into blue, green, and red colored light by the red-pass dichroic mirror 180, and green-reflective dichroic mirror 181. The green, red, and blue colored light separated enters into the polarization separating prisms 184 to 186 respectively.

The polarization separating prisms 184 to 186 each have a polarization separating film configured by a dielectric multilayer. An incident angle of the polarization separating film is 45°, and passes P-polarized light against a surface of the polarization separating film and reflects S-polarized light. The S-polarized light of green, red, and blue colored light that is reflected enters into reflective liquid crystal panels 187 to 189 respectively. The reflective liquid crystal panels 187 to 189 each are in the active matrix method, and comprise a liquid crystal layer and a reflective film.

Homeotropic liquid crystal, HAN mode liquid crystal, or 45-degree twisted nematic liquid crystal is used as liquid crystal. If a voltage according to a picture signal is applied to the reflective liquid crystal panel, the birefringence of the liquid crystal changes. Light incident to the reflective liquid crystal panel passes the liquid crystal, is reflected by the reflective film, and passes the liquid crystal again. During this process, a polarized state of the light is changed by the birefringence from the S-polarized light to the P-polarized light, and the light outgoes.

After outgoing from the reflective liquid crystal panel 187 and passing through the polarization separating prism 184, green P-polarized colored light enters into the dichroic prism 184 that is a color synthesizing means. Respective red and blue P-polarized colored light outgoing from the reflective liquid crystal panels 188 and 189 respectively passes through the polarization separating prisms 185 and 186, and is rotated to the S-polarized light in the polarized direction by the half-wave plates 190 and 191. After that, the red and blue P-polarized colored light enters into the dichroic prism 194 that is a color synthesizing means. The green, red, and blue colored light is synthesized by the dichroic prism 194, and is projected on the screen with being enlarged by the projection lens 195.

On the other hand, the S-polarized light whose polarized state is not changed by the reflective liquid crystal panels 187 to 189 is reflected by the polarization separating prisms 184 to 186, and returns to the optical illumination apparatus 139. In this manner, optical images that are formed by the reflective liquid crystal panels as changes of polarized states of light are projected on the screen (not shown) with being enlarged, and hence a full color projected image is formed.

As described above, in an optical illumination apparatus converging and synthesizing light from a plurality of light sources near an optical axis of the optical illumination apparatus, it is possible to extremely efficiently and uniformly illuminate liquid crystal panels with the light from the plurality of light sources by regulating within constant values the eccentricity d of the optical axis of the light from the plurality of light sources against the optical axis of the optical illumination apparatus and a lens element pitch p of a first lens array plate, as described in the above embodiment.

Therefore, it is possible to configure the image projection apparatus where the uniformity is good and the efficiency of light utilization is high.

It is possible to configure the image projection apparatus that is bright in high resolution, since the image projection apparatus is constructed with using three reflective liquid crystal panels.

In the embodiments described above, although examples each using liquid crystal panels using polarization and scattering are shown as image forming means, it is an alternative method to use an image forming means that forms an optical image according to an picture signal by changing an outgoing angle of reflected light through changing slopes of multiple minute mirrors two-dimensionally located. In addition, it is another method to configure a back-projection image projection apparatus with using a transmission-type screen.

In addition, although the above embodiments show each case that a polarization transforming optical member is not provided in the optical illumination apparatus used in the image projection apparatus, the present invention is not limited to this. For example, in case of a method of forming an image by modulating light with using polarization, another optical illumination apparatus of the present invention comprising a polarization transforming optical member 98 shown in FIG. 8 can be used.

Furthermore, although the above embodiments show each case that two light sources are provided, the present invention is not limited to this. For example, by applying the above relations even in the case of four light sources, the same effects can be exhibited. In this case, a shape of a reflecting prism is a quadrangular pyramid.

Moreover, although the above embodiments 1 and 2 show each case that equation 1 or 2 is satisfied, the present invention is not limited to this. For example, the eccentricity d and pitch p can be determined so that equations 1 and 2 may be satisfied simultaneously in the configuration shown in FIG. 1. In this case, better effects can be exhibited.

What is claimed is:

1. An optical illumination apparatus for converging light from light sources and illuminating image forming means for forming an image, comprising:

a plurality of light sources;

elliptical mirrors for converging light, emitted from the plurality of light sources, respectively;

reflecting means, each of which is located near a focal point of each of the ellipsoidal mirrors, for accepting light from the ellipsoidal mirrors and reflecting the light in a predetermined direction;

converging means for accepting the light reflected by the reflecting means and sending out substantially parallel light;

a first lens array plate, which is configured by a plurality of lenses, for dividing the light coming from the converging means into multiple light beams; and a second lens array plate, which is configured by a plurality of lenses, for accepting the light from the first lens array plate, wherein optical axes of respective rays of light coming from the plurality of light sources are decentered against an optical axis of the optical illumination apparatus; and wherein an eccentricity d meets the following in equal equation:

$$0.19 \ m \leq d \leq 0.55 \ m$$

where m is a paraxial magnification of each ellipsoidal mirror that is a ratio between a distance from an apex of the ellipsoidal mirror to a second focal point of the ellipsoidal mirror and a distance from the apex to a first focal point of the ellipsoidal mirror.

2. The optical illumination apparatus according to claim 1, comprising:

polarization separating means for separating natural light, which outgoes from the second lens array plate, into two rays of polarized light whose polarized directions are orthogonal to each other; and polarization rotating means for rotating a direction of one ray of polarized light included in the two rays of polarized light that outgo from the polarization separating means.

3. The optical illumination apparatus according to claim 1, wherein the reflecting means is a reflecting prism comprising a plurality of reflecting surfaces.

4. The optical illumination apparatus according to claim 1, wherein an aluminum film or a dielectric film is provided in each reflecting surface of the reflecting means.

5. The optical illumination apparatus according to claim 1, wherein the converging means comprises an aspherical lens that decreases a spherical aberration.

6. The optical illumination apparatus according to claim 5, wherein the aspherical lens is produced by molding.

7. The optical illumination apparatus according to claim 5, wherein the aspherical lens is made of a resin.

8. The optical illumination apparatus according to claim 2, wherein the polarization separating means is a polarization separating prism array where a plurality of polarization separating prisms, each of which comprises a polarization separating film and a reflective film, are arrayed at a constant pitch in the direction perpendicular to a plane including optical axes of respective rays of light coming from the plurality of light sources.

9. The optical illumination apparatus according to claim 2, wherein the polarization rotating means is a half-wave plate made of a drawn resin film.

10. An image projection apparatus comprising:

an optical illumination apparatus according to claim 1;

image forming means for accepting light from the optical illumination apparatus and forming an optical image according to a picture signal; and a projection lens for projecting the optical image, formed on the image forming means, on a screen.

11. An image projection apparatus comprising:

an optical illumination apparatus according to claim 1;

color separating optical means for separating white light from the light sources into blue, green, and red colored light;

three sets of image forming means for accepting respective rays of colored light coming from the color separating optical means and forming each optical image according to a picture signal;

color synthesizing optical means for accepting the blue, green, and red colored light outgoing from the image forming means and synthesizing the blue, green, and red colored light; and a projection lens for projecting the optical image, formed on the image forming means, on a screen.

12. An image projection apparatus comprising:

an optical illumination apparatus according to claim 1;

color separating optical means for separating white light from the light sources into blue, green, and red colored light;

polarization separating prisms for accepting respective rays of colored light from the color separating optical means and separating each of the incident light into two beams of light having two polarized directions that are orthogonal to each other;

three sets of image forming means for accepting respective rays of light coming from the polarization separating prisms and forming respective optical images according to a picture signal;

color synthesizing optical means for synthesizing the blue, green, and red colored light entering after passing through the polarization separating prisms and outgoing from the image forming means; and a projection lens for projecting the optical images, formed on the image forming means, on a screen.

13. The image projection apparatus according to claim 10, wherein the image forming means are transmissive liquid crystal panels.

14. The image projection apparatus according to claim 11, wherein the image forming means are transmissive liquid crystal panels.

15. The image projection apparatus according to claim 12, wherein the image forming means are reflective liquid crystal panels.

16. An optical illumination apparatus for converging light from light sources and illuminating image forming means for forming an image, comprising:

a plurality of light sources;

elliptical mirrors for converging light, emitted from the plurality of light sources, respectively;

reflecting means, each of which is located near a focal point of each of the ellipsoidal mirrors, for accepting light from the ellipsoidal mirrors and reflecting the light in a predetermined direction;

converging means for accepting the light reflected by the reflecting means and sending out substantially parallel light;

a first lens array plate, which is configured by a plurality of lens elements, for dividing the light coming from the converging means into multiple light beams; and a second lens array plate, which is configured by a plurality of lens elements, for accepting the light from the first lens array plate, wherein optical axes of respective rays of light coming from the plurality of light sources are decentered against an optical axis of the optical illumination apparatus; and wherein the following in equal equation is established:

$$0.33 \leq d/p \leq 0.52$$

where d is an eccentricity and p is a pitch of lens elements of the first lens array plate.

17. The optical illumination apparatus according to claim 16, comprising:

polarization separating means for separating natural light, which outgoes from the second lens array plate, into two rays of polarized light whose polarized directions are orthogonal to each other; and polarization rotating means for rotating a direction of one ray of polarized light included in the two rays of polarized light that outgo from the polarization separating means.

18. The optical illumination apparatus according to claim 16, wherein the reflecting means is a reflecting prism comprising a plurality of reflecting surfaces.

19. The optical illumination apparatus according to claim 16, wherein an aluminum film or a dielectric film is provided in each reflecting surface of the reflecting means.

20. The optical illumination apparatus according to claim 16, wherein the converging means comprises an aspherical lens that decreases a spherical aberration.

21. The optical illumination apparatus according to claim 20, wherein the aspherical lens is produced by molding.

22. The optical illumination apparatus according to claim 20, wherein the aspherical lens is made of a resin.

23. The optical illumination apparatus according to claim 17, wherein the polarization separating means is a polarization separating prism array where a plurality of polarization separating prisms, each of which comprises a polarization separating film and a reflective film, are arrayed at a constant pitch in the direction perpendicular to a plane including optical axes of respective rays of light coming from the plurality of light sources.

24. The optical illumination apparatus according to claim 17, wherein the polarization rotating means is a half-wave plate made of a drawn resin film.

25. An image projection apparatus comprising:

an optical illumination apparatus according to claim 16;

image forming means for accepting light from the optical illumination apparatus and forming an optical image according to a picture signal; and a projection lens for projecting the optical image, formed on the image forming means, on a screen.

26. An image projection apparatus comprising:

an optical illumination apparatus according to claim 16;

color separating optical means for separating white light from the light sources into blue, green, and red colored light;

three sets of image forming means for accepting respective rays of colored light coming from the color separating optical means and forming each optical image according to a picture signal;

color synthesizing optical means for accepting the blue, green, and red colored light outgoing from the image forming means and synthesizing the blue, green, and red colored light; and a projection lens for projecting the optical image, formed on the image forming means, on a screen.

27. An image projection apparatus comprising:

an optical illumination apparatus according to claim 16;

color separating optical means for separating white light from the light sources into blue, green, and red colored light;

polarization separating prisms for accepting respective rays of colored light from the color separating optical means and separating each of the incident light into two beams of light having two polarized directions that are orthogonal to each other;

three sets of image forming means for accepting respective rays of light coming from the polarization separating prisms and forming respective optical images according to a picture signal;

color synthesizing optical means for synthesizing the blue, green, and red colored light entering after passing through the polarization separating prisms and outgoing from the image forming means; and a projection lens for projecting the optical images, formed on the image forming means, on a screen.

28. The image projection apparatus according to claim 25, wherein the image forming means are transmissive liquid crystal panels.

29. The image projection apparatus according to claim 26, wherein the image forming means are transmissive liquid crystal panels.

30. The image projection apparatus according to claim 27, wherein the image forming means are reflective liquid crystal panels.

* * * * *